United States Patent
Kreitzer et al.

(10) Patent No.: US 7,230,770 B2
(45) Date of Patent: Jun. 12, 2007

(54) PROJECTION LENSES HAVING COLOR-CORRECTING REAR LENS UNITS

(75) Inventors: Melvyn H. Kreitzer, Cincinnati, OH (US); Jacob Moskovich, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/194,324

(22) Filed: Aug. 1, 2005

(65) Prior Publication Data
US 2006/0028739 A1 Feb. 9, 2006

Related U.S. Application Data

(63) Continuation-in-part of application No. 11/040,922, filed on Jan. 21, 2005.

(60) Provisional application No. 60/598,611, filed on Aug. 4, 2004.

(51) Int. Cl.
G02B 3/00 (2006.01)
G02B 9/00 (2006.01)

(52) U.S. Cl. .................. 359/649; 359/663; 359/708

(58) Field of Classification Search ......... 359/649–651
See application file for complete search history.

(56) References Cited

U.S. PATENT DOCUMENTS

| | | | |
|---|---|---|---|
| 5,313,330 A | 5/1994 | Betensky | |
| 5,625,495 A | 4/1997 | Moskovich | |
| 5,900,987 A | 5/1999 | Kreitzer et al. | |
| 6,111,703 A | 8/2000 | Hozumi | |
| 6,195,209 B1 | 2/2001 | Kreitzer et al. | |
| 6,324,014 B1 | 11/2001 | Moskovich | |
| 6,417,971 B1 | 7/2002 | Moskovich | |
| 6,445,512 B1 | 9/2002 | Moskovich | |
| 6,476,974 B1 | 11/2002 | Kreitzer | |
| 6,542,316 B2 * | 4/2003 | Yoneyama | 359/749 |
| 6,563,650 B2 | 5/2003 | Moskovich | |
| 6,765,731 B1 | 7/2004 | Cannon | |

(Continued)

FOREIGN PATENT DOCUMENTS

WO    WO00/67059    11/2000

(Continued)

OTHER PUBLICATIONS

J. Hoogland, "The Design of Apochromatic Lenses," in *Recent Development in Optical Design*, R.A. Ruhloff editor, Perkin-Elmer Corporation, Norwalk, CT, 1968, pp. 6-1 to 6-7.

Primary Examiner—Jordan M. Schwartz
(74) Attorney, Agent, or Firm—George W. Jonas

(57) ABSTRACT

Projection lenses for use with pixelized panels (PP) are provided. The projection lenses have a first unit (U1) separated from a positive second unit (U2). The lenses are telecentric on the short conjugate side, have a large field of view in the direction of the long conjugate, have low aberration levels, and include a space between two of the lens elements making up the lens which is sufficient to accept a reflective surface (RS) for folding the lens' optical axis. The second or rear lens unit (U2) includes at least a first color-correcting lens subunit (SU2/CC1) which has a positive-followed-by-negative form and contributes to the correction of the chromatic aberrations of the projection lens, including the correction of lateral color.

27 Claims, 11 Drawing Sheets

U.S. PATENT DOCUMENTS

| | | |
|---|---|---|
| 6,853,493 B2 | 2/2005 | Kreitzer |
| 2002/0141072 A1 | 10/2002 | Moskovich |
| 2004/0130799 A1 | 7/2004 | Kreitzer |
| 2005/0270657 A1* | 12/2005 | Moskovich ................. 359/649 |

FOREIGN PATENT DOCUMENTS

| | | |
|---|---|---|
| WO | WO02/071124 | 9/2002 |
| WO | WO04/063787 | 7/2004 |

* cited by examiner

PROJECTION LENSES HAVING COLOR-CORRECTING REAR LENS UNITS

CROSS REFERENCE TO RELATED PROVISIONAL APPLICATION

This application is a Continuation-In-Part of U.S. application Ser. No. 11/040,922 filed Jan. 21, 2005 which claims the benefit under 35 USC §119(e) to Provisional Application No. 60/598,611, filed on Aug. 4, 2004, entitled FOLDABLE PROJECTION LENSES, the contents of both applications are incorporated herein in their entirety.

FIELD OF THE INVENTION

This invention relates to projection lenses and, in particular, to foldable, telecentric projection lenses having color-correcting rear lens units for use in forming an image of an object composed of pixels, such as, a DMD, a reflective LCD, a transmissive LCD, or the like. The lenses are particularly well-suited for use with DMD panels.

BACKGROUND OF THE INVENTION

A. Definitions

As used in this specification and in the claims, the following terms shall have the following meanings:

(1) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity.

In practical applications, a telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have a pupil at a long distance from the lens' elements, and the term "telecentric pupil" is used to describe such a pupil at a long distance from the lens' elements. For the projection lenses of the invention, the telecentric pupil distance will in general be at least about 20 times the lens' focal length.

(2) Effective Back Focal Length

The effective back focal length (BFL) of a projection lens/pixelized panel combination is the distance between the front surface of the pixelized panel and the vertex of the back surface of the rearward-most lens element of the projection lens which has optical power when (1) the image of the pixelized panel is located at infinity and (2) the projection lens is located in air, i.e., the space between the rearward-most lens element of the projection lens and the pixelized panel is filled with air as opposed to the glasses making up the prisms, beam splitters, etc. normally used between a projection lens and a pixelized panel.

(3) Q-Value

As described in J. Hoogland, "The Design of Apochromatic Lenses," in *Recent Development in Optical Design*, R. A. Ruhloff editor, Perkin-Elmer Corporation, Norwalk, Conn., 1968, pages 6-1 to 6-7, the contents of which are incorporated herein by reference, Q-values can be calculated for optical materials and serve as a convenient measure of the partial dispersion properties of the material.

Hoogland's Q-values are based on a material's indices of refraction at the e-line (546 nanometers), the F' line (480 nanometers), and the C' line (643.8 nanometers). The wavelengths used herein, both in the specification and in the claims, are the d line (587.56 nanometers), the F line (486.13 nanometers), and the C line (656.27 nanometers).

More particularly, as described in Hoogland, the Q-value for a lens element is determined using the indices of refraction $N_d$, $N_F$, and $N_C$ of the material making up the element at the d, F, and C lines, respectively, and the equation:

$$Q=(y-y_n)\times 10^6$$

where y is given by:

$$y=(N_F-N_d)/(N_d-1)$$

and $y_n$ is determined from an equation of the form:

$$y_n=ax+b$$

evaluated at the x-value for the material making up the lens element, where x is given by:

$$x=(N_F-N_C)/(N_d-1)$$

and a and b are determined using x and y values for SK16 and SF2.

(4) V-Value

V-values (also known as Abbe constants) are for the d, F, and C lines and are given by:

$$V=(N_d-1)/(N_F-N_C)$$

(5) Effective V-Value

The effective V-value (Ve) of one or more lens elements is given by:

$$Ve=\Sigma Vi\cdot fi$$

where the summation is over the one or more lens elements and Vi and fi are, respectively, the V-values and focal lengths of the individual lens elements.

(6) N-Value

Indices of refraction (N-values) are for the d-line (587.56 nanometers) in Table 9. All focal lengths and other calculated values which depend on a single value for the index of refraction for individual elements are for the e-line (546.1 nanometers).

(7) Vignetting

The vignetting of a projection lens in percent is defined as 100 minus 100 times the ratio, in the long conjugate focal plane, of the illuminance at the full field to the illuminance on-axis at the projection lens' working f-number. Since projection lenses normally do not include an adjustable iris and are used "wide open," the working f-number will typically be the full aperture f-number.

B. Projection Systems

Image projection systems are used to form an image of an object, such as a display panel, on a viewing screen. Such systems can be of the front projection or rear projection type, depending on whether the viewer and the object are on the same side of the screen (front projection) or on opposite sides of the screen (rear projection).

FIG. 11 shows in simplified form the basic components of an image projection system 17 for use with a pixelized imaging device (also known in the art as a "digital light valve"). In this figure, 10 is an illumination system, which comprises a light source 11 and illumination optics 12 which transfer some of the light from the light source towards the screen, 13 is the imaging device, and 14 is a projection lens which forms an enlarged image of the imaging device on viewing screen 15. For front projection systems, the viewer will be on the left side of screen 15 in FIG. 11, while for rear projection systems, the viewer will be on the right side of the screen.

For ease of presentation, FIG. 11 shows the components of the system in a linear arrangement. For a reflective imaging device and, in particular, for a DMD imaging device of the type with which the present invention will typically be used, the illumination system is arranged so that light from that system reflects off of the imaging device, i.e., the light impinges on the front of the imaging device as opposed to the back of the device as shown in FIG. 11. Also, for such imaging devices, one or more prism assemblies (see "PR" in FIGS. 1–10) will be located in front of the imaging device and will receive illumination light from the illumination system and will provide imaging light to the projection lens. In addition, for rear projection systems which are to be housed in a single cabinet, one or more mirrors are often used between the projection lens and the screen to fold the optical path and thus reduce the system's overall size.

The linear arrangement shown in FIG. 11 can also be modified in the case of a transmissive imaging device. Specifically, in this case, the optical path between the imaging device and the screen can include two folds to reduce the overall size of the cabinet used to house the system, e.g., a first fold mirror can be placed between imaging device 13 and projection lens 14 and a second fold mirror can be placed between the projection lens and screen 15.

Image projection systems preferably employ a single projection lens which forms an image of: (1) a single imaging device which produces, either sequentially or simultaneously, the red, green, and blue components of the final image; or (2) three imaging devices, one for red light, a second for green light, and a third for blue light. Rather than using one or three imaging devices, some image projection systems have used two or up to six imagers. Also, for certain applications, e.g., large image rear projection systems, multiple projection lenses are used, with each lens and its associated imaging device(s) producing a portion of the overall image. Irrespective of the details of the application, the projection lens generally needs to have a relatively long effective back focal length to accommodate the prisms, beam splitters, and other components normally used with pixelized panels. In the preferred embodiments of the present invention, a single projection lens is used to form an image of a single imaging device, e.g., a DMD panel. For this application, the projection lens needs to have a relatively long effective back focal length to accommodate the one or more prism assemblies used with such a panel.

A particularly important application of projection systems employing pixelized panels is in the area of rear projection systems which can be used as large screen projection televisions (PTVs) and/or computer monitors. To compete effectively with the established cathode ray tube (CRT) technology, projection systems based on pixelized panels need to be smaller in size and lower in weight than CRT systems having the same screen size.

SUMMARY OF THE INVENTION

In accordance with a first aspect, the invention provides a projection lens for forming an enlarged image of a pixelized panel (PP) on a screen, said projection lens having an optical axis, a long conjugate side, a short conjugate side, and an effective focal length $f_0$, said lens, in order from the long conjugate side to the short conjugate side, comprising:

(I) a first lens unit (U1) which, in order from the long conjugate side to the short conjugate side, comprises:
  (A) a lens element $L_{U1/N1}$ which:
    (i) has a short conjugate surface which is concave towards the short conjugate side,
    (ii) comprises at least one aspheric surface, and
    (iii) has a negative optical power; and
  (B) at least one other lens element; and (II) a second lens unit (U2) having a positive power, said lens unit, in order from the long conjugate side to the short conjugate side, comprising:
  (A) a color-correcting doublet (e.g., a cemented doublet) which, from the long conjugate side to the short conjugate side, has a positive-followed-by-negative form; and
  (B) at least one positive lens element;

wherein:
(a) the first and second lens units are the only lens units of the projection lens;
(b) the projection lens has an aperture stop (AS) that is located between the first and second lens units;
(c) all of the optical surfaces of the second lens unit which have optical power are spherical surfaces;
(d) the projection lens has a field of view in the direction of the long conjugate which is greater than or equal to 75 degrees (preferably, greater than or equal to 85 degrees);
(e) the projection lens is telecentric on the short conjugate side;
(f) the projection lens has an effective back focal length BFL which satisfies the relationship:

$$BFL/f_0 \geq 2.0 \text{ (preferably } \geq 2.5\text{); and}$$

(g) the projection lens has a mechanical spacing S between two of its lens elements which satisfies the relationship:

$$S/f_0 \geq 3.5 \text{ (preferably } \geq 5.0, \text{ more preferably } \geq 7.0\text{),}$$

where the mechanical spacing is the smaller of the center-to-center distance and the edge-to-edge distance between the elements for an unfolded optical axis.

Feature (c) of the first aspect of the invention (i.e., the requirement that all of the optical surfaces of the second lens unit which have optical power are spherical surfaces) is important because optical surfaces which are spherical surfaces are generally easier to manufacture and projection lenses employing components having such surfaces are less likely to suffer from problems relating to manufacturing tolerances. In accordance with the first aspect of the invention, it has been discovered that high levels of aberration correction, including high levels of monochromatic aberration correction, can be achieved without the use of aspheric surfaces in the second lens unit.

In accordance with certain embodiments of the first aspect of the invention, all of the lens elements of the second lens unit are composed of glass. The use of glass elements in the second lens unit makes the projection lens less prone to changes in its optical performance as heated from room temperature to its operating temperature, which can be in the range of 40° C.

In accordance with a second aspect, the invention provides a projection lens for forming an enlarged image of a pixelized panel (PP) on a screen, said projection lens having an optical axis, a long conjugate side, a short conjugate side, and an effective focal length $f_0$, said lens, in order from the long conjugate side to the short conjugate side, comprising:

(I) a first lens unit (U1) which, in order from the long conjugate side to the short conjugate side, comprises:

(A) a lens element $L_{U1/N1}$ which:
(i) has a short conjugate surface which is concave towards the short conjugate side,
(ii) comprises at least one aspheric surface, and
(iii) has a negative optical power; and
(B) at least one other lens element; and (II) a second lens unit (U2) having a positive power, said lens unit, in order from the long conjugate side to the short conjugate side, comprising:

(A) a first color-correcting doublet (e.g., a cemented doublet) which, from the long conjugate side to the short conjugate side, has a positive-followed-by-negative form;
(B) a first positive lens element; and
(C) a second color-correcting doublet (e.g., a cemented doublet) which, from the long conjugate side to the short conjugate side, has a negative-followed-by-positive form;

wherein:

(a) the first and second lens units are the only lens units of the projection lens;

(b) the projection lens has an aperture stop (AS) that is located between the first and second lens units;

(c) the projection lens has a field of view in the direction of the long conjugate which is greater than or equal to 75 degrees (preferably, greater than or equal to 85 degrees);

(d) the projection lens is telecentric on the short conjugate side;

(e) the projection lens has an effective back focal length BFL which satisfies the relationship:

$$BFL/f_0 \geq 2.0 \text{ (preferably } \geq 2.5\text{); and}$$

(f) the projection lens has a mechanical spacing S between two of its lens elements which satisfies the relationship:

$$S/f_0 \geq 3.5 \text{ (preferably } \geq 5.0\text{, more preferably } \geq 7.0\text{),}$$

where the mechanical spacing is the smaller of the center-to-center distance and the edge-to-edge distance between the elements for an unfolded optical axis.

In certain embodiments of the second aspect of the invention, the second lens unit can comprise a second positive lens element which is either on the long conjugate side of the first color-correcting doublet or on the short conjugate side of the second color-correcting doublet. For these embodiments, all of the optical surfaces of the second lens unit which have optical power can be optical surfaces of (1) the first color-correcting doublet, (2) the second color-correcting doublet, (3) the first positive lens element, and (4) the second positive lens element, i.e., the two doublets and the two positive lens elements can be the only components of the second lens unit with optical power. Similarly, for embodiments of the second aspect of the invention which do not employ a second positive lens element, all of the optical surfaces of the second lens unit which have optical power can be optical surfaces of (1) the first color-correcting doublet, (2) the second color-correcting doublet, and (3) the first positive lens element, i.e., the two doublets and the first positive lens elements can be the only components of the second lens unit with optical power.

In accordance with a third aspect, the invention provides a projection lens for forming an enlarged image of a pixelized panel (PP) on a screen, said projection lens having an optical axis, a long conjugate side, a short conjugate side, and an effective focal length $f_0$, said lens, in order from the long conjugate side to the short conjugate side, comprising:

(I) a first lens unit (U1) which, in order from the long conjugate side to the short conjugate side, comprises:

(A) a first lens subunit (SU1/N) which comprises a lens element $L_{U1/N1}$ which:
(i) has a short conjugate surface which is concave towards the short conjugate side,
(ii) comprises at least one aspheric surface, and
(iii) has a negative optical power; and
(B) a second lens subunit (SU1/P) which comprises at least one lens element (e.g., the second lens subunit can be a single positive lens element); and (II) a second lens unit (U2) having a positive power, said lens unit, in order from the long conjugate side to the short conjugate side, comprising:

(A) a first color-correcting subunit (SU2/CC1) (e.g., a subunit which has a negative power or a weak (fSU2/CC1÷$f_0$≥2, preferably ≥5) positive power), said subunit having an effective V-value Ve/CC1 and comprising a color-correcting doublet (e.g., a cemented doublet) which, in order from the long conjugate side to the short conjugate side, comprises:

(i) a positive lens element having a V-value Vp/CC1, a Q-value Qp/CC1, and a short conjugate radius RI1; and
(ii) a negative lens element having a V-value Vn/CC1 and a Q-value Qn/CC1; and (B) a second color-correcting subunit (SU2/CC2) (e.g., a subunit which has a weak power (|fSU2/CC1|÷$f_0$≥2, preferably ≥5)), said subunit having an effective V-value Ve/CC2 and comprising a color-correcting doublet (e.g., a cemented doublet) which, in order from the long conjugate side to the short conjugate side, comprises:

(i) a negative lens element having a V-value Vn/CC2 and a Q-value Qn/CC2; and
(ii) a positive lens element having a V-value Vp/CC2, a Q-value Qp/CC2, and a long conjugate radius RI2;

wherein:

(a) the first and second lens units are the only lens units of the projection lens;

(b) the projection lens has an aperture stop (AS) that is located between the first and second lens units;

(c) the projection lens has a field of view in the direction of the long conjugate which is greater than or equal to 75 degrees (preferably, greater than or equal to 85 degrees);

(d) the projection lens is telecentric on the short conjugate side;

(e) the projection lens has an effective back focal length BFL which satisfies the relationship:

$$BFL/f_0 \geq 2.0 \text{ (preferably } \geq 2.5\text{);}$$

(f) the projection lens has a mechanical spacing S between two of its lens elements which satisfies the relationship:

$$S/f_0 \geq 3.5 \text{ (preferably } \geq 5.0\text{, more preferably } \geq 7.0\text{),}$$

where the mechanical spacing is the smaller of the center-to-center distance and the edge-to-edge distance between the elements for an unfolded optical axis; and (g) Ve/CC1, Vp/CC1, Qp/CC1, RI1, Vn/CC1, Qn/CC1, fSU2/P, Ve/CC2, Vn/CC2, Qn/CC2, Vp/CC2, Qp/CC2, and RI2 satisfy the relationships:

$$|Ve/CC1| < |Ve/CC2|,$$

$$0.25 \leq |RI1/(Vp/CC1 - Vn/CC1)| \leq 0.60$$

$$\text{(preferably, } 0.30 \leq |RI1/(Vp/CC1 - Vn/CC1)| \leq 0.55\text{),}$$

$Qp/CC1>0$, $0.35 \leq |RI2/(Vp/CC2-Vn/CC2)| \leq 1.4$ (preferably, $0.35 \leq |RI2/(Vp/CC2-Vn/CC2)| \leq 1.2$), $Qp/CC2>0$, and $Qn/CC1<0$ and/or $Qn/CC2<0$ (preferably, Qn/CC1 and Qn/CC2 are both less than zero).

With regard to the ranges for the $|RI1/(Vp/CC1-Vn/CC1)|$ and $|RI2/(Vp/CC2-Vn/CC2)|$ ratios, if those ratios drop below the lower limits set forth above, the performance of the projection lens becomes sensitive to manufacturing tolerances, e.g., tilt and/or decentering of the subunits and/or their components. On the other hand, if the ratios rise above the upper limits, correction of chromatic aberrations, including secondary lateral color, is compromised. The preferred ranges provide even a better combination of manufacturability and effective correction of chromatic aberrations.

In certain embodiments of the third aspect of the invention, the second lens unit can further comprise a subunit SU2/P comprising at least one lens element and having a focal length fSU2/P and/or a subunit SU2/P' comprising at least one lens element and having a focal length fSU2/P', wherein:

(i) said subunit SU2/P is between the first color-correcting subunit and the second color-correcting subunit;

(ii) said subunit SU2/P' is either on the long conjugate side of the first color-correcting subunit or on the short conjugate side of the second color-correcting subunit;

(iii) fSU2/P>0; and (iv) fSU2/P'>0.

For these embodiments, all of the optical surfaces of the second lens unit which have optical power can be optical surfaces of (1) the first color-correcting subunit, (2) the second color-correcting subunit, and (3) the SU2/P subunit and/or the SU2/P' subunit, i.e., the components of these three (or four) subunits can be the only components of the second lens unit with optical power.

In accordance with the third aspect of the invention, the first lens subunit of the first lens unit can optionally further comprise a biconcave lens element $L_{U1/N2}$ which:

(i) is on the short conjugate side of the lens element $L_{U1/N1}$, and (ii) comprises at least one aspheric surface.

In accordance with certain embodiments of the second and/or third aspects of the invention, all of the optical surfaces of the second lens unit which have optical power are spherical surfaces and/or all of those lens elements are composed of glass. As discussed above in connection with the first aspect of the invention, in accordance with the invention it has been discovered that high levels of aberration correction can be achieved without the use of aspheric surfaces. The elimination of aspheric surfaces, in turn, can reduce the cost of the projection lens and improve its manufacturability and sensitivity to tolerances. As also discussed above, the use of only glass elements in the second lens unit can improve the projection lens' thermal performance, i.e., it can lead to smaller changes in the optical properties of the projection lens as compared to projection lenses which employ plastic elements in the rear lens unit.

In its preferred embodiments, the projection lenses of the first, second, and/or third aspects of the invention can include a reflective surface (RS) for folding the projection lens' optical axis, said reflective surface being between the lens elements which are spaced apart by the mechanical spacing S. The reflective surface can, for example, be a mirror or prism which produces a fold in the optical axis in the range of, for example, 60–70°, e.g., approximately 64°).

It should be noted that the projection lens can have a physical aperture stop or can use the output of the illumination system as a virtual aperture stop (see, for example, Betensky, U.S. Pat. No. 5,313,330). In either case, the aperture stop is preferably on the short conjugate side of the reflective surface. Alternatively, but less preferred, the aperture stop can be located at the reflective surface, e.g., an aperture stop can be applied to or painted onto the reflective surface. Note that for the projection lens to operate efficiently, the aperture stop should either completely clear the reflective surface or should be completely on the reflective surface, i.e., the reflective surface should not intersect and thus cut off a part of the aperture stop.

Although an aperture stop on the long conjugate side of the reflective surface can be used in the practice of the invention, such a location for the aperture stop is generally not preferred since the second lens unit then must have a long focal length to produce a telecentric entrance pupil for the overall lens.

In accordance with other aspects, the invention provides a projection lens system which comprises a projection lens in accordance with the first, second, and/or third aspects of the invention and a pixelized panel (PP) which, preferably, is a DMD panel.

The reference symbols used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention. Also, the above listed aspects of the invention, as well as the preferred and other embodiments of the invention discussed herein, can be used separately or in any and all combinations.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification.

DESCRIPTION OF THE PREFERRED EMBODIMENTS

Figure 1:
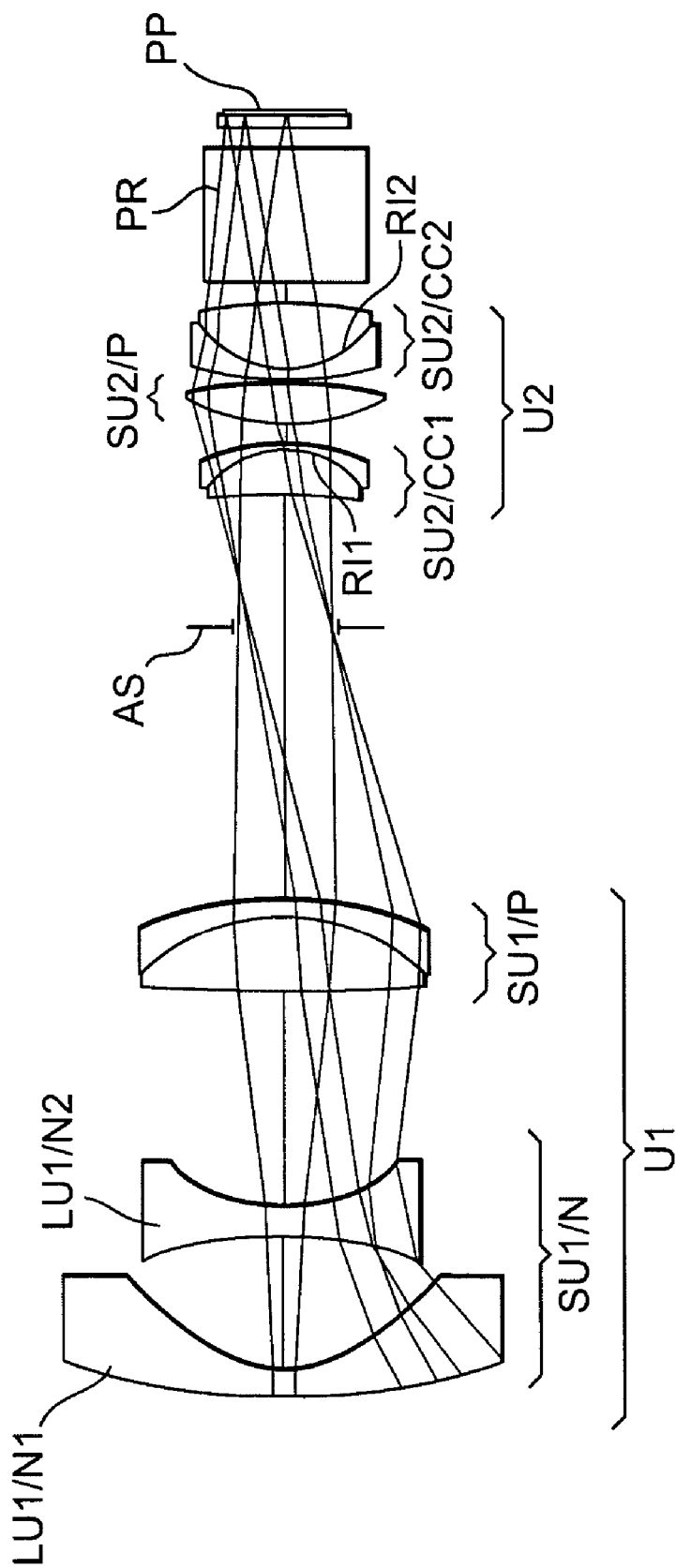
FIGS. 1–8 are schematic side views of representative projection lenses constructed in accordance with the invention in an unfolded configuration.
Figure 2:
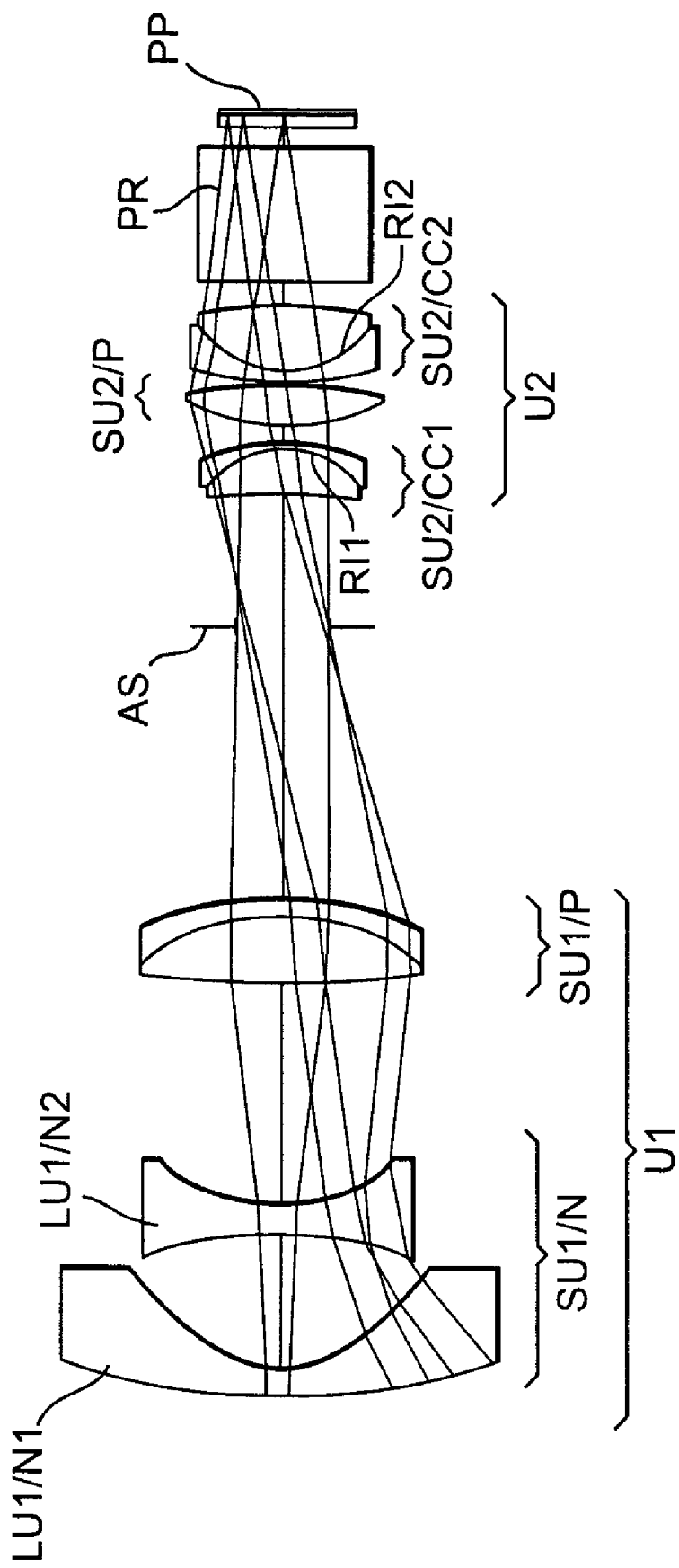
Figure 3:
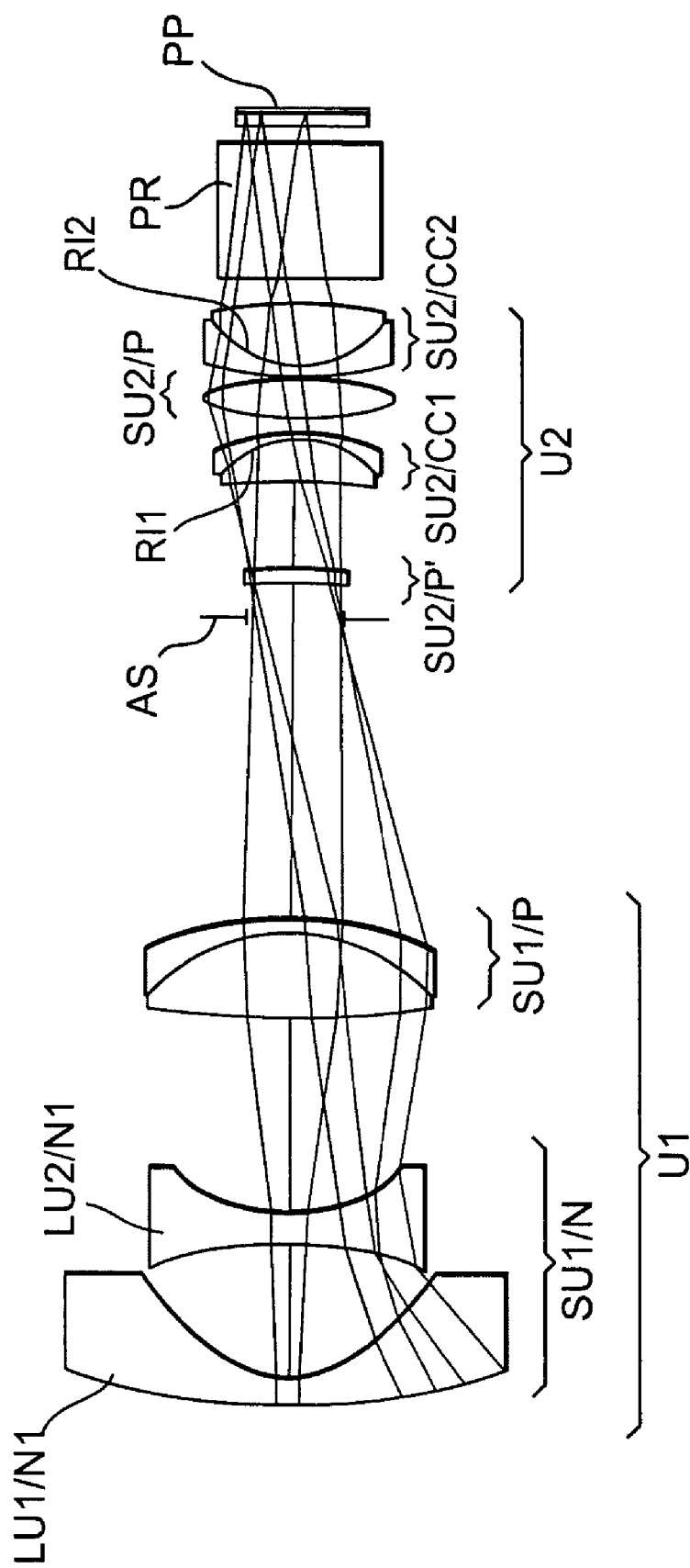
Figure 4:
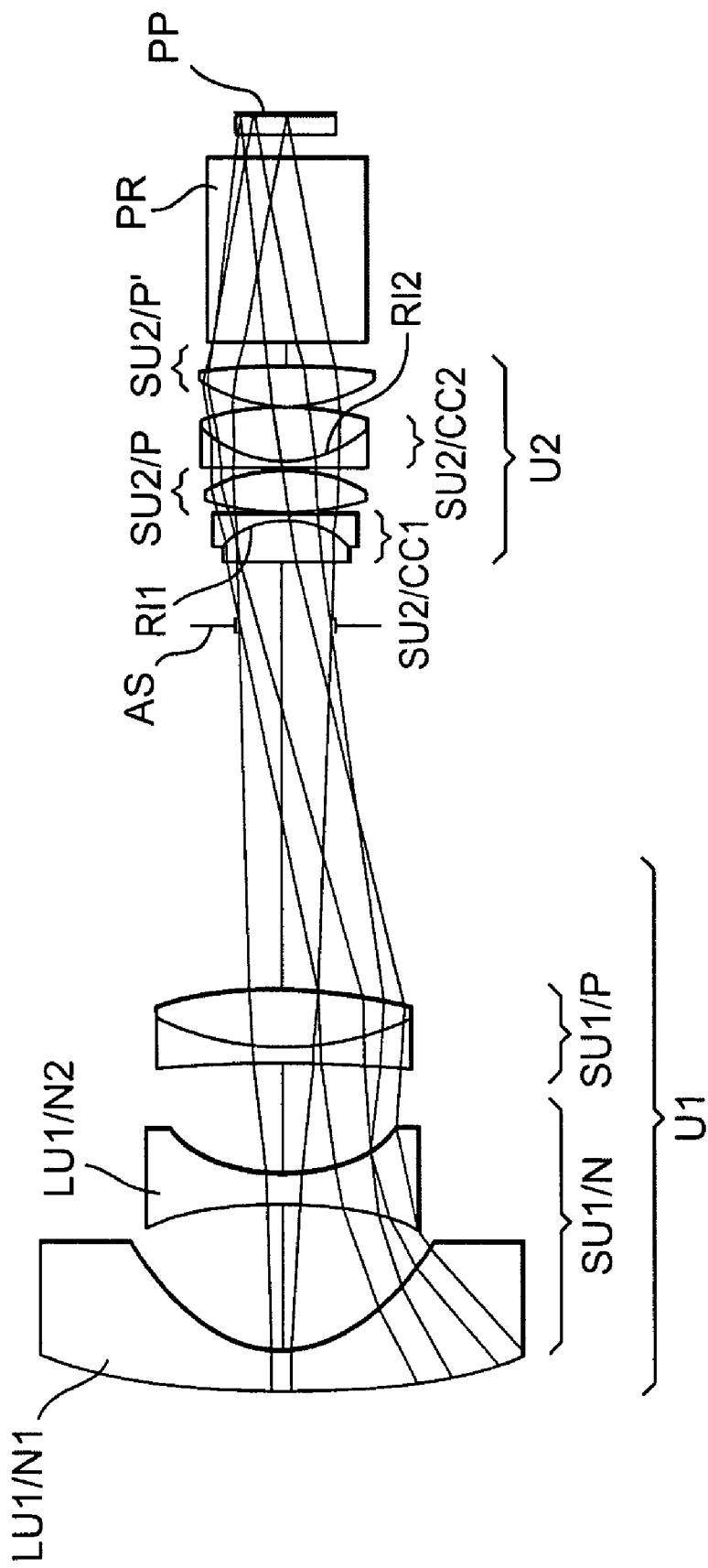
Figure 5:
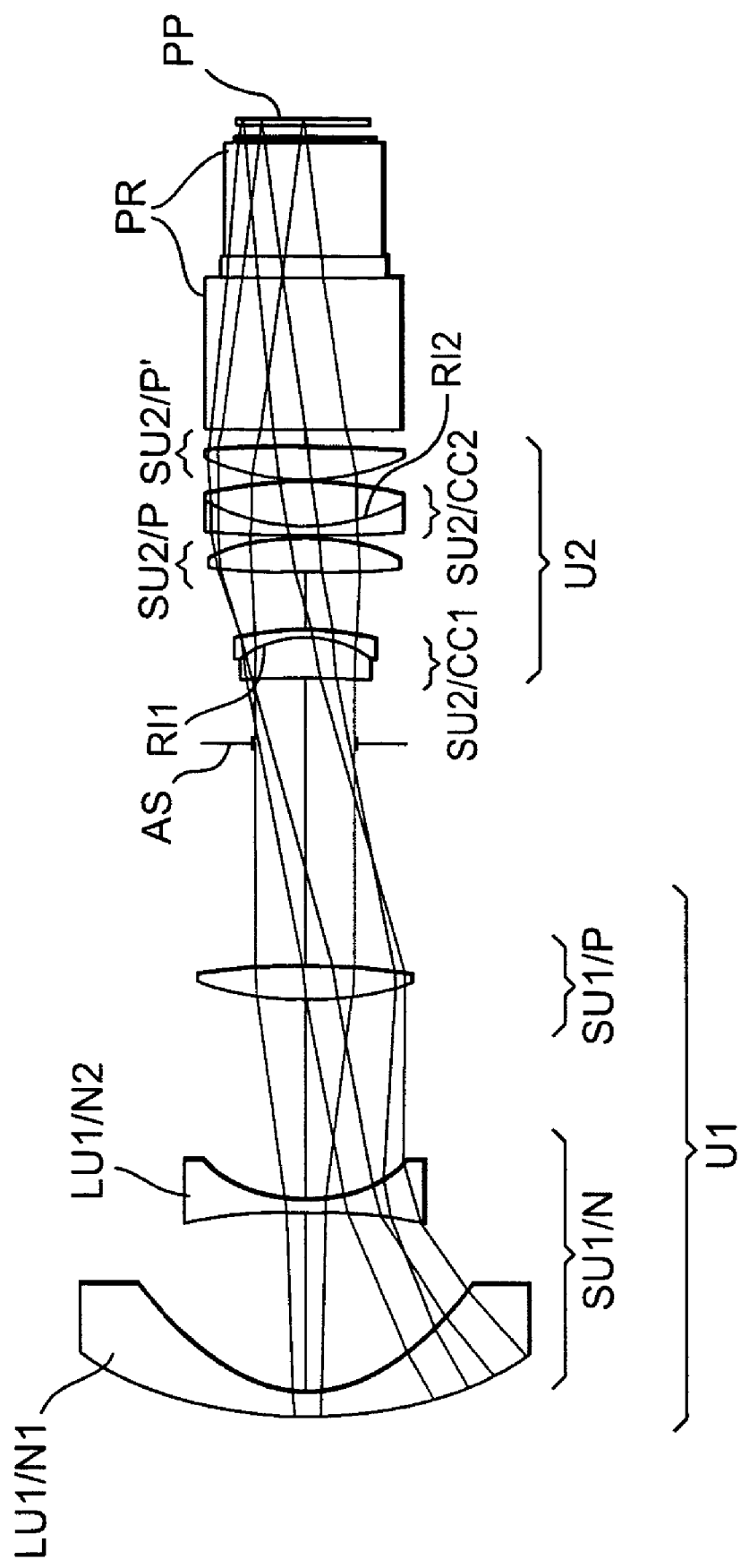
Figure 6:
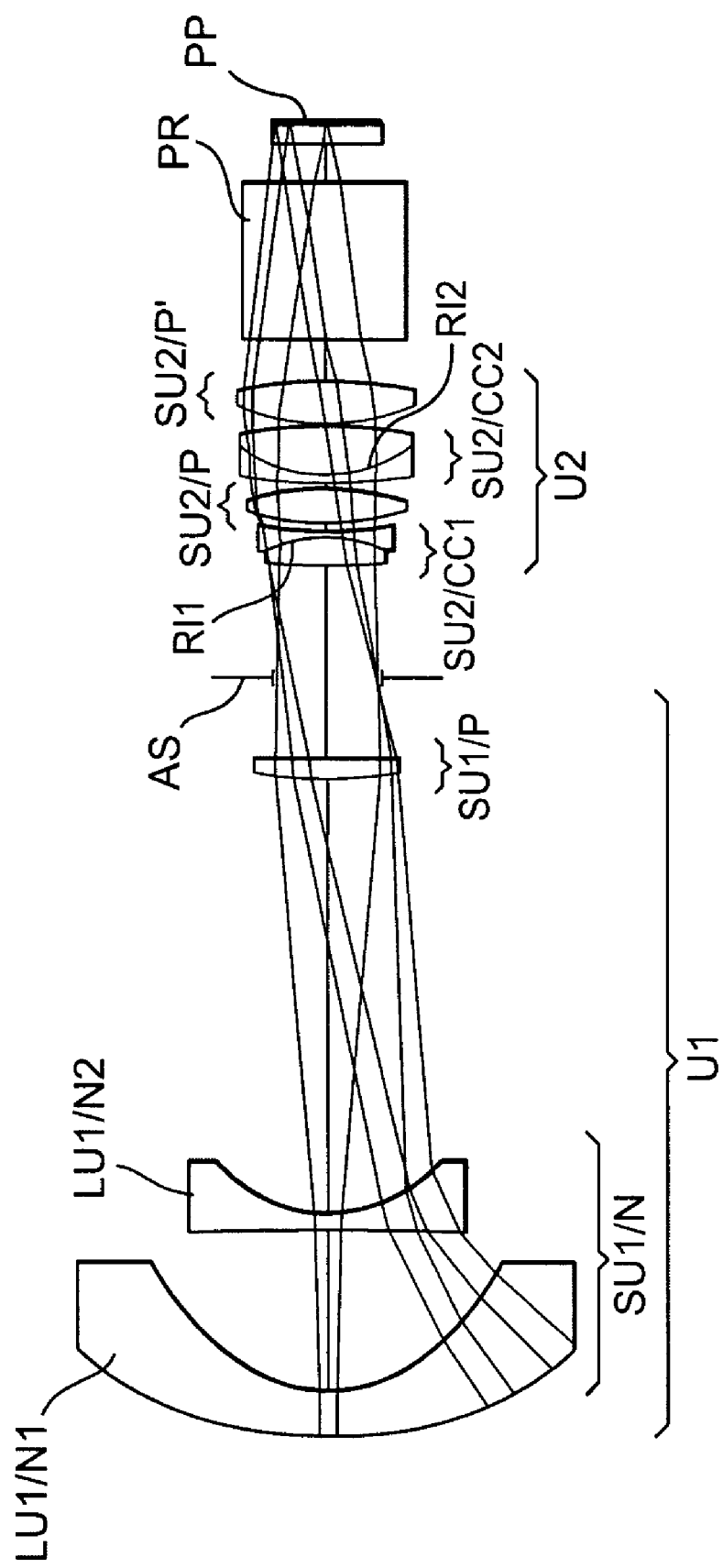
Figure 7:
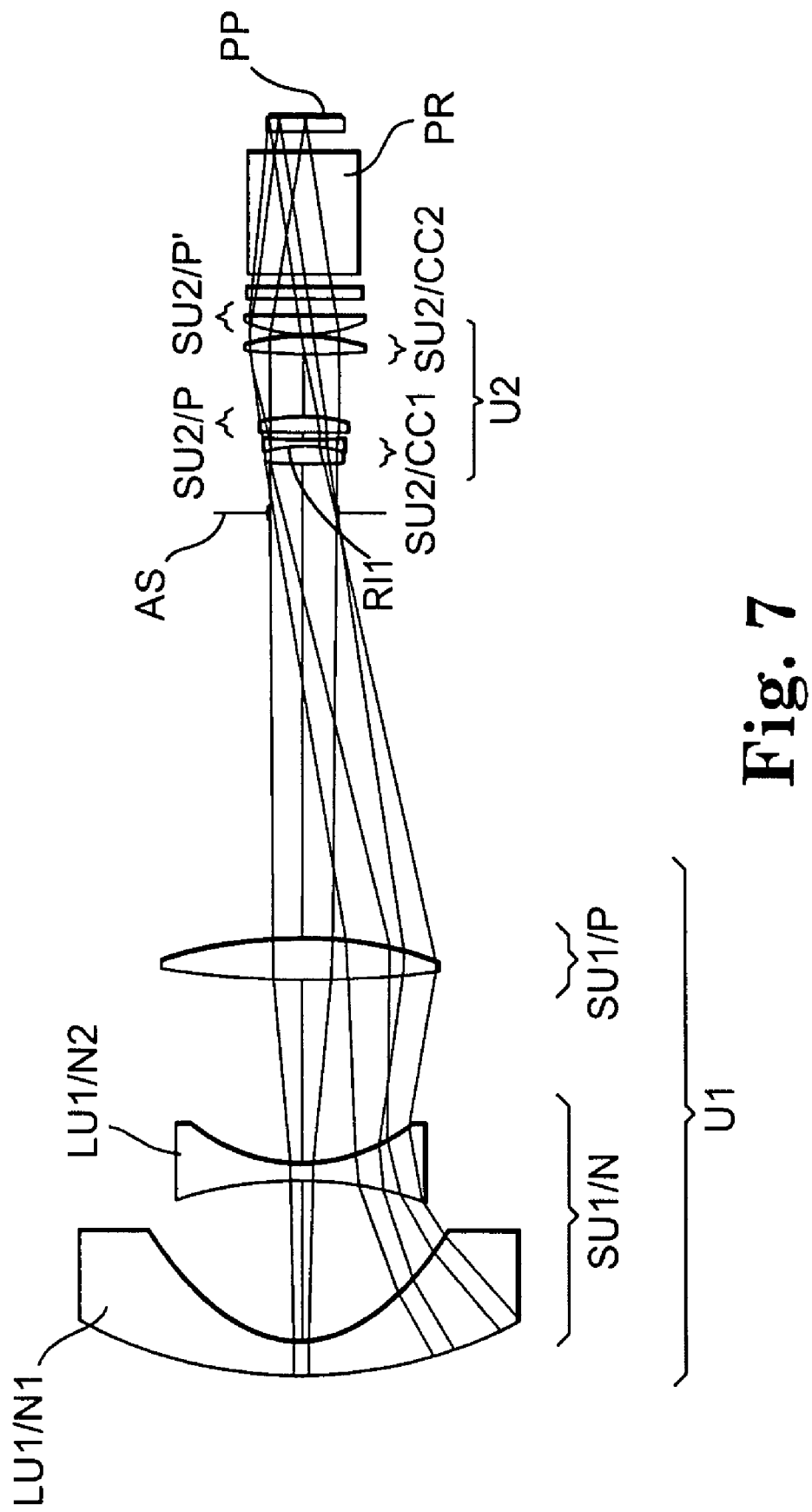
Figure 8:
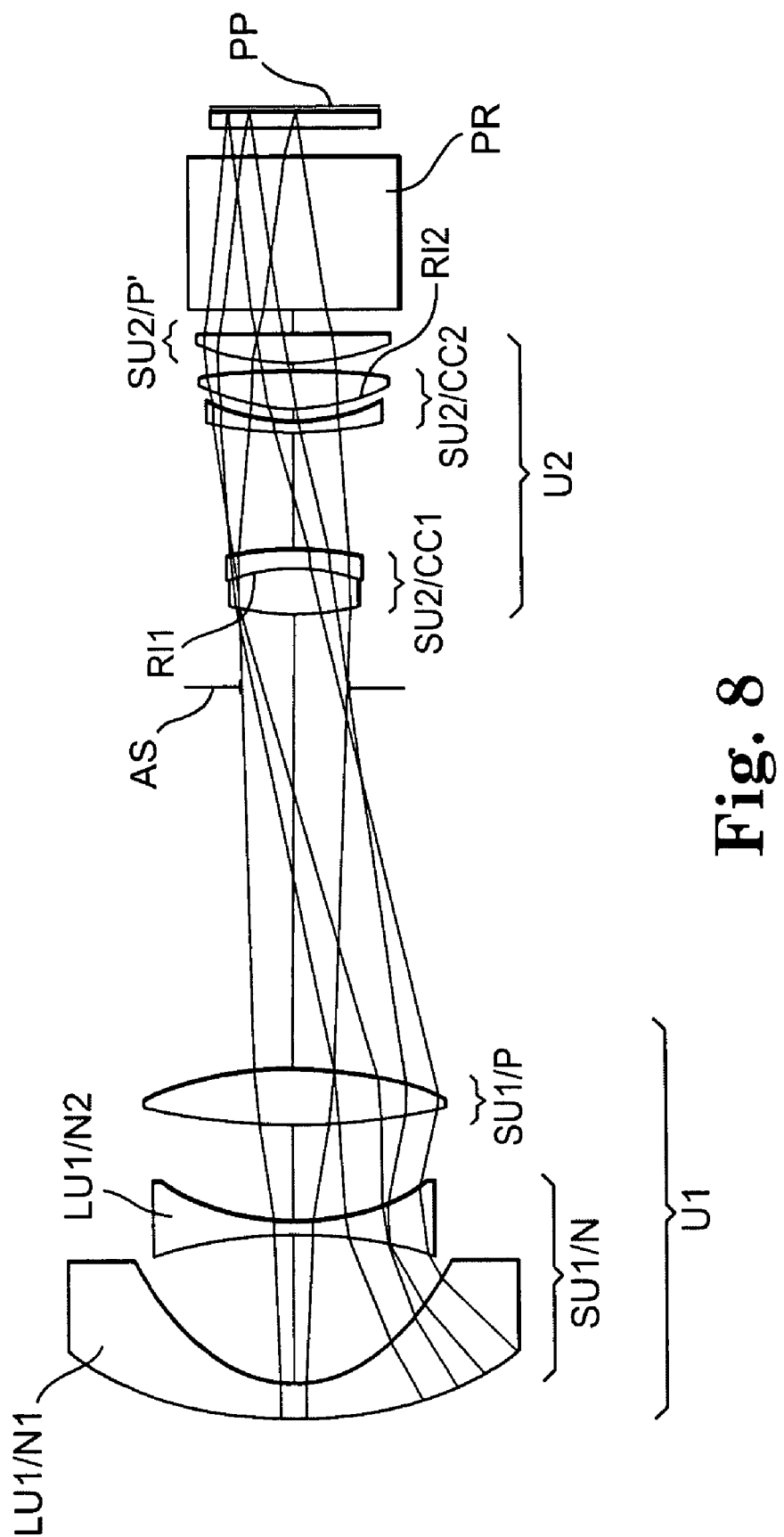

To display images having a high information content (e.g., to display data), a microdisplay must have a large number of pixels. Since the devices themselves are small, the individual pixels are small, a typical pixel size ranging from 17μ for DMD displays to approximately 8μ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing CRTs a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

In terms of lateral color, the projection lenses of the invention preferably have a lateral color LC in the lens' short conjugate focal plane which satisfies the relationships:

$$LC_{red-blue} \leq 0.0010 * f_0,$$

$$LC_{red-green} \leq 0.0012 * f_0, \text{ and}$$

$$LC_{blue-green} \leq 0.0012 * f_0,$$

where (i) the relationships are satisfied over the full field in the short conjugate focal plane and (ii) the red, green, and blue wavelengths are 0.64 micrometers, 0.55 micrometers, and 0.44 micrometers, respectively. The projection lenses of Tables 1, 2, 3a–3b, 4, 5a–5e, 6a–6d, 7 and 8 satisfy these criteria.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center.

Moreover, projection lenses are often used with offset panels. In particular, in the case of DMDs, an offset is typically needed to provide the appropriate illumination geometry and to allow the dark-field light to miss the entrance pupil of the lens. This dark-field light corresponds to the off position of the pixels of the DMD.

When a panel is offset, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In terms of distortion, the projection lenses of the invention preferably have a percentage distortion D which:

(i) over the full field has a magnitude that is less than 1.0 (i.e., at all points of the field the magnitude of the distortion is less than 1.0%); and (ii) over the half field-to-full field range has a maximum value $D_{max}$ and a minimum value $D_{min}$ which satisfy the relationship:

$$|D_{max} - D_{min}| \leq 0.4.$$

The second of these criteria for a high level of distortion correction is directed to the phenomenon known as "apparent distortion." When looking at an image on a screen, users are particularly sensitive to curvature along the top or bottom of the image. Such curvature will arise if the distortion varies between, for example, the middle of the top of the screen to the edges of the top of the screen. For a typical 16:9 format, the middle of the top of the screen corresponds to the half field of view and the edges of the top of the screen correspond to the full field of view. By keeping the variation in percentage distortion over this range below 0.4, the problem of apparent distortion is avoided.

The projection lenses of Tables 1, 2, 3a–3b, 4, 5a–5e, 6a–6d, 7 and 8 satisfy the above criteria for distortion.

In addition to high levels of color and distortion correction, projection lenses for use with pixelized panels need to have low levels of ghost generation, especially when the pixelized panel is of the reflective type, e.g., a DMD or reflective LCD.

As known in the art, ghosts can be generated by image light reflecting back towards the object from one of the lens surfaces of a projection lens. Depending upon the shape of the lens surface and its location relative to the object, such reflected light can be re-reflected off of the object so that it reenters the projection lens and is projected onto the screen along with the desired image. Such ghost light always reduces contrast at least to some extent. In extreme cases, a second image can actually be seen on the screen.

Because the operation of DMDs and reflective LCDs depend upon their ability to reflect light efficiently, projection systems employing panels of these types are particularly susceptible to ghost problems. Ghosts can also be generated by light reflecting backwards off of one lens surface and then being re-reflected in a forward direction by a second lens surface. When reflective pixelized panels are used, ghosts generated by reflections from two lens surfaces are generally less troublesome than ghosts generated by a lens surface/pixelized panel combination.

The above-mentioned pixelized panels and, in particular, DMDs, typically require that the light beam from the illumination system has a near-normal angle of incidence upon the display.

In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the aperture stop which makes the correction of lateral color more difficult.

For rear projection systems, there is an ever increasing demand for smaller cabinet sizes (smaller footprints).

In terms of the projection lens, this translates into a requirement that the lens has a wide field of view in the direction of the image (screen), i.e., a field of view of at least 75 degrees. Further increases in the field of view from, for example, 80° to, for example, 94°, can be of substantial significance to manufacturers of projection televisions. This is so because such an increase in the field of view of the projection lens can allow the TV manufacturer to reduce the dimensions of its cabinet by an inch or more. A smaller cabinet, in turn, makes a projection television more desirable in the highly competitive consumer market for PTVs.

The requirement for a large field of view makes it even more difficult to correct the lateral color of the lens. This is especially so when combined with the requirement for a relatively long effective back focal length which itself makes it more difficult to correct lateral color. Also, the requirement for telecentricity is a third factor which makes the correction of lateral color challenging.

In addition to increasing the field of view, cabinet sizes can also be reduced through the use of a folded projection lens, i.e., a lens having an internal reflective surface (e.g. a mirror or prism) which allows the lens to have an overall form which is easier to integrate with the other components of the projection system and is more compact. In terms of lens design, the use of such a reflective surface means that two of the lens elements making up the projection lens must be separated by a distance which is sufficiently long to receive the reflective surface. A construction of this type makes it more difficult to correct the aberrations of the system, especially if the lens is to include only a relatively small number of lens elements as is desired to reduce the cost, weight, and complexity of the projection lens.

Achieving a relatively long back focal length, a wide field of view in the direction of the lens' long conjugate, telecentricity, and a folded configuration, while still maintaining high levels of aberration correction with low levels of ghost generation, is particularly challenging since these various requirements tend to work against one another. As illustrated by the examples presented below, the present invention in its preferred embodiments provides projection lenses which simultaneously satisfy these competing design criteria.

The projection lenses of the present invention are of the retrofocus or the inverted telephoto type and consist of two lens units, i.e., a first unit (U1) on the long conjugate side and a second unit (U2) on the short conjugate side, which are separated by a physical or virtual aperture stop. The first lens unit has strong negative power on its long conjugate side. Its overall power can be negative or weakly positive. When positive, the focal length of the first lens unit (f1) can satisfy the relationship $f1/f_0 \geq 2.5$, preferably the relationship $f1/f_0 \geq 5$, and most preferably the relationship $f1/f_0 \geq 7$. The second lens unit has a positive focal length. Its focal length (f2) can satisfy the relationship $f2/f_0 \leq 10$, and preferably the relationship $f2/f_0 \leq 7$.

The use of a lens form of the retrofocus type to produce an image of a pixelized panel has various advantages. Thus, telecentricity can be achieved by locating the lens' aperture stop in the front focal plane of the second positive unit. Additional advantages, illustrated by the examples presented below, are the ability to achieve a relatively long effective back focal length and the ability to provide a wide field of view in the direction of the lens' long conjugate. As discussed above, both of these characteristics are particularly useful in rear projection systems, where the lens must have a wide field of view to achieve the smallest possible overall package size, and where there is a need to accommodate beam splitting prisms and/or beam guiding prisms between the lens and the pixelized panel. These prisms may include TIR prisms, polarizing beam splitters, and/or color splitting prisms.

The lenses of the invention achieve a high level of distortion correction by using two or more aspherical surfaces in the first lens unit. Specifically, the $L_{U1/N1}$ and $L_{U1/N2}$ lens elements each has one aspherical surface and preferably at least one of the two elements has two aspherical surfaces. Most preferably, both lens elements have two aspherical surfaces.

In the examples presented below, the second lens unit uses only glass elements, none of which have an aspherical surface, and such a construction for the second lens unit is preferred. However, if desired, some residual distortion, as well as spherical aberration of the lens' entrance pupil, can be corrected through the use of one or more aspherical surfaces in the second lens unit. The spherical aberration of the entrance pupil should be minimized to achieve telecentricity for any arbitrary point in the object plane of the lens. Preferably, the aspherical surfaces of the first lens unit are formed on plastic lens elements and the aspherical surfaces of the second lens unit, if used, are formed on glass lens elements so as to maintain a high level of thermal performance.

As illustrated by the examples presented below, the second lens unit of the invention has a color-correcting doublet (e.g., a cemented doublet) which forms the unit's long conjugate side or is generally in the vicinity of the unit's long conjugate side. This color-correcting doublet has a positive-followed-by-negative form. In accordance with the invention, it has been surprisingly found that the positive-followed-by-negative form produces better levels of color correction than a negative-followed-by-positive form. As set forth above, this orientation is a feature of each of the first, second, and third aspects of the invention.

In certain embodiments, the second lens unit has the following form: a color-correcting doublet followed by a single positive element followed by a color-correcting doublet. When this form is used, it is preferred that there be no intervening lens elements between the doublets and the positive lens element, i.e., any additional lens elements are preferably on the long or short conjugate sides of the doublet/positive element/doublet form, but not within the form.

The second lens unit preferably contains 5 or 6 lens elements, although more lens elements can be used if desired. The first lens unit preferably contains 3 or 4 lens elements, although again more lens elements can be used if desired. Thus, the entire projection lens preferably employs a total of 8 to 10 lens elements, which helps reduce the cost, complexity, and weight of the projection lens. It should be noted that reducing the number of lens elements in the first lens unit is especially important from a cost point of view since the lens elements of the first lens unit will have the largest clear apertures.

The most critical aberration that must be corrected is the lens' lateral color. The lenses of the invention preferably achieve such correction using anomalous dispersion glasses (also known as "abnormal partial dispersion" glasses) and/or optical materials having particular Q-values as discussed in Moskovich, U.S. Pat. No. 5,625,495, entitled "Telecentric Lens Systems For Forming an Image of an Object Composed of Pixels," and Kreitzer et al., U.S. Pat. No. 6,195,209, entitled "Projection Lenses Having Reduced Lateral Color for Use with Pixelized Panels," the contents of both of which are incorporated herein by reference.

In the preferred embodiments of the invention, lateral color correction, including secondary lateral color correction, is achieved by: (1) employing at least two negative lens elements in the first lens unit which are composed of plastic materials having high +Q values, i.e., $L_{U1/N1}$ and $L_{U1/N2}$, and (2) employing at least one positive lens element (and, preferably, at least two positive lens elements) in the second lens unit composed of a glass having an abnormal partial dispersion. In this way, the use of expensive anomalous dispersion glasses in the first lens unit, where elements are large, can be avoided, which significantly reduces the cost of the lens.

The preferred plastic material for use in the $L_{U1/N1}$ and $L_{U1/N2}$ lens elements of the first lens unit is acrylic, although other low dispersion, high +Q plastics, e.g., COC, can be used for one or both of these elements if desired. A variety of anomalous dispersion glasses can be used in the second lens unit, examples of which include OHARA S-FPL51, OHARA S-FPL52, and OHARA S-PHM52 glasses. Other anomalous dispersion glasses can, of course, be used in the practice of the invention if desired.

As illustrated by the examples presented below, in some cases, the second lens unit can include a third positive lens element composed of anomalous dispersion glass. Additional positive lens elements having an anomalous dispersion can be used in the second unit if desired, but are generally not needed and are not preferred because they increase the cost of the lens.

In addition to the $L_{U1/N1}$ and $L_{U1/N2}$ lens elements, the first lens unit also includes a positive lens element and can include a third negative lens element. The positive lens element is preferably composed of a glass material, as is the third negative lens element, when used. Preferably, when a third negative lens element is used, the positive lens element and the third negative lens element are in the form of a cemented doublet. The dispersion properties of these glass elements are chosen primarily to help in the correction of axial color without unduly compromising the correction of lateral color and, in particular, the correction of secondary lateral color, achieved through the use of $L_{U1/N1}$, $L_{U1/N2}$, and the anomalous dispersion glasses of the second lens unit. To minimize costs, inexpensive glasses are preferred for the positive lens element and the third negative lens element, when used.

As discussed above, the use of reflective pixelized panels can exacerbate the problem of ghost formation since such panels are designed to reflect light. This problem can be addressed during the lens design process by ensuring that the axial marginal ray traced through the projection lens from the projection lens' short conjugate focal plane intersects each lens surface of the projection lens' second lens unit at an angle of incidence θi that is greater than or equal to 1.5 degrees.

For example, a constraint of this type can be incorporated in the lens design computer program at the beginning of the design process. Alternatively, as a lens design is being developed, the shape of offending surfaces can be changed to meet this criterion. Because the height of the axial marginal ray tends to be small at the long conjugate end of the lens and because the light energy available for reflection at the long conjugate end is also relatively small, maintaining θi greater than or equal to 1.5 degrees is more important for the second lens unit than the first lens unit. Thus, the first lens unit can have θi values that are less than 1.5 degrees without exhibiting substantial ghost problems.

In addition to controlling the angle of incidence Oi, the ghost problem can also be addressed by minimizing the number of lens elements and thus the number of reflection surfaces included in the projection lens. Using smaller numbers of lens elements also reduces the cost, weight, and complexity of the projection lens.

In terms of vignetting, the projection lenses of the invention preferably exhibit no more than 35% (more preferably, no more than 30%) vignetting at its working f-number, where the working f-number is preferably less than or equal to 2.4 (e.g., approximately 2.0).

Without intending to limit it in any manner, the present invention will be more fully described by the following examples.

EXAMPLES

Figure 9:
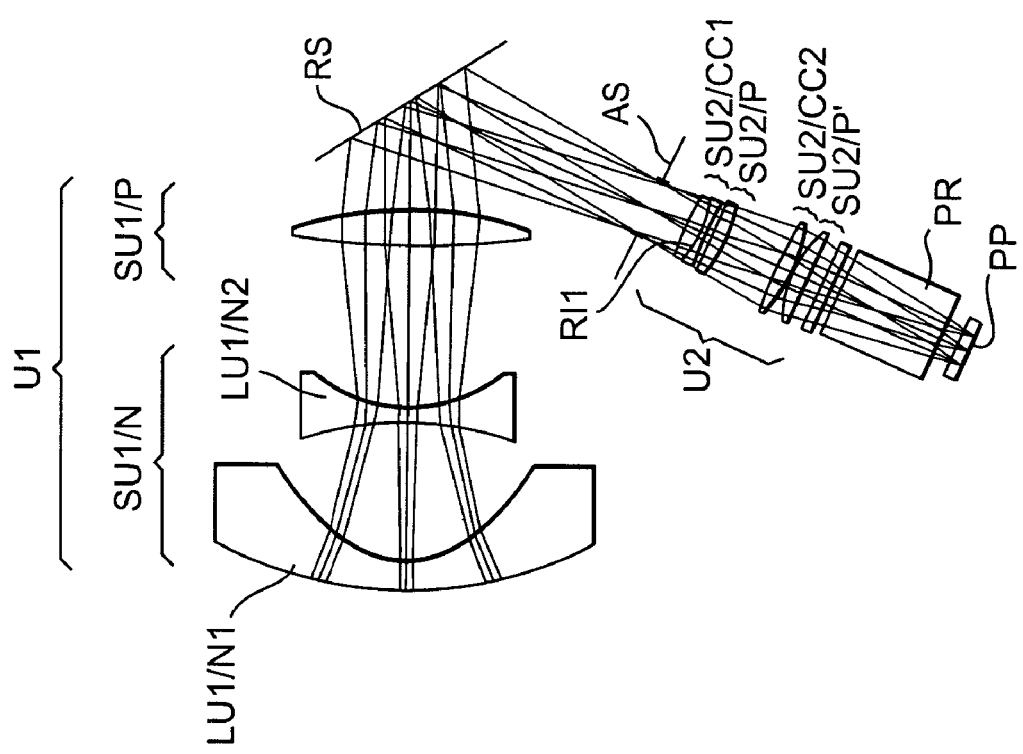
FIGS. 9 and 10 are schematic side views of the projection lens of FIGS. 7 and 6, respectively, in their folded configuration. During a typical application of the invention, the projection lenses of FIGS. 1–5 and 8 will be similarly folded.
Figure 10:
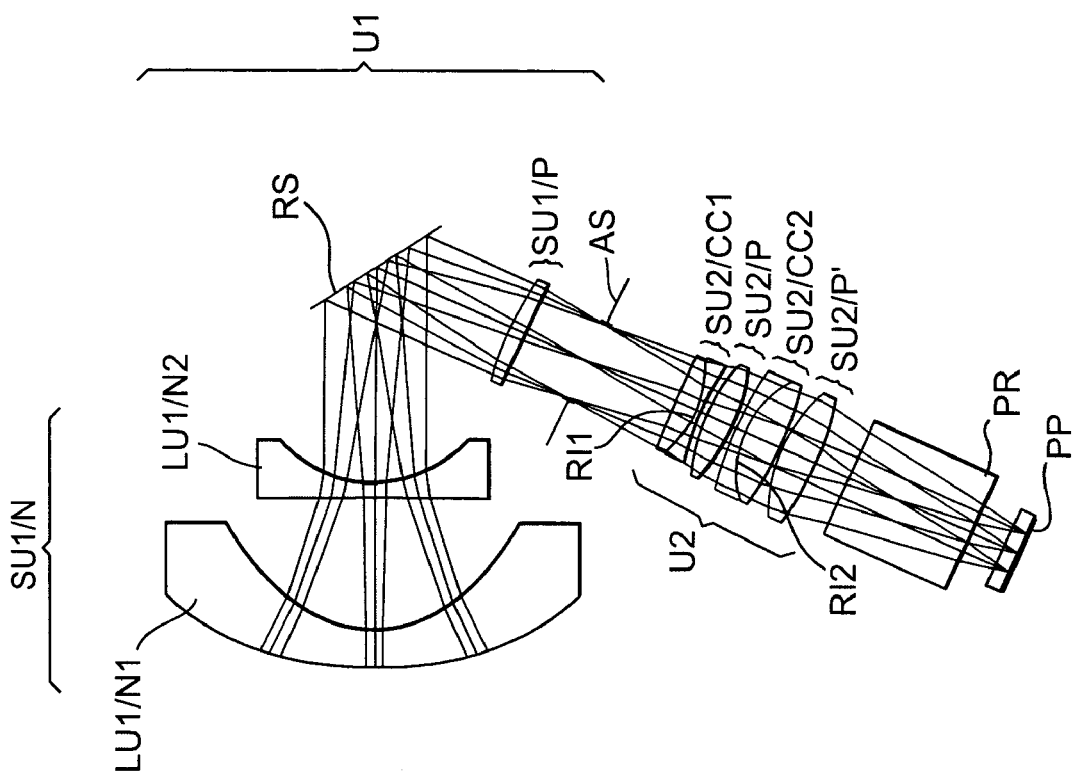
Figure 11:
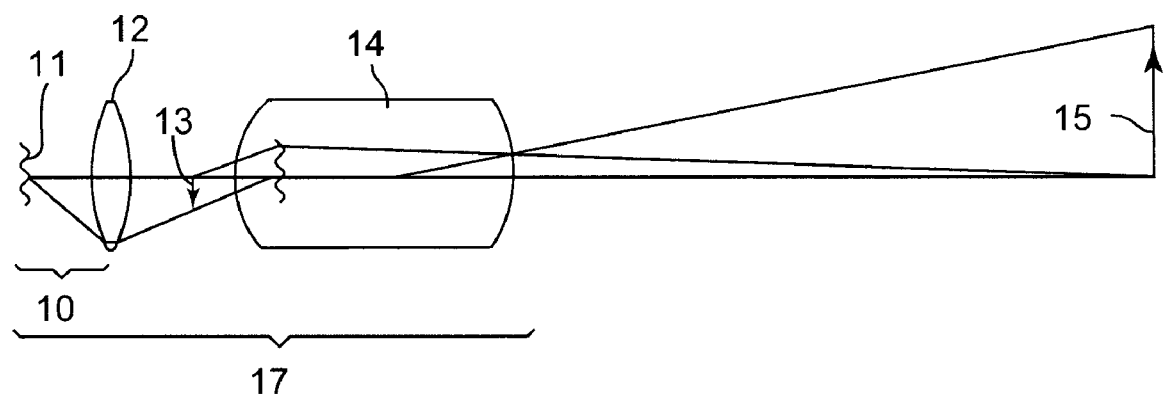
FIG. 11 is a schematic diagram showing an overall projection lens system in which the projection lenses of the present invention can be used. As with FIGS. 1–8, for ease of illustration, this figure does not show the projection lens in its folded configuration. Similarly, the details of the telecentricity of the projection lens are not shown in FIG. 11.

FIGS. 1–8 illustrate representative projection lenses constructed in accordance with the invention. Tables 1, 2, 3a, 4, 5a, 6a, 7 and 8 correspond to FIGS. 1–8, respectively. Tables 3b, 5b–5e, and 6c–6d set forth further examples which have the same components as FIGS. 3, 5, and 6, respectively, but with somewhat different lens shapes and spacings than those specifically illustrated in these figures. FIGS. 9 and 10 illustrate folded versions of the lenses of FIGS. 7 and 6, respectively.

In terms of the first, second, and third aspects of the invention discussed above, the examples of Tables 1, 2, 3a–3b, 4, 5a–5e, 6a–6d, 7 and 8 illustrate the first aspect, the examples of Tables 1, 2, 3a–3b, 4, 5a–5e, and 6a–6d illustrate the second aspect, and Tables 1, 2, 3a–3b, 4, 5a–5e, 6a–6d, and 8 illustrate the third aspect.

OHARA designations are used for the various glasses employed in the lens systems. Equivalent glasses made by other manufacturers (e.g., HOYA or SCHOTT) can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1, 2, 3a-3b, 4, 5a-5e, 6a-6d, 7 and 8.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero. The various planar structures located on the short conjugate side of U2 in the figures and tables represent components (e.g., prism PR) which are used with or are a part of the pixelized panel. They do not constitute part of the projection lens. Surfaces within the projection lens which have an infinite radius are vignetting surfaces (e.g., surfaces included in the design process to take account of the folding of the optical axis by the reflective surface). All dimensions given in Tables 1, 2, 3a–3b, 4, 5a–5e, 6a–6d, 7 and 8 and in summary Tables 10 and 11 are in millimeters. Table 9 sets forth the N, V, and Q values for the optical materials used in the projection lenses of Tables 1, 2, 3a–3b, 4, 5a–5e, 6a–6d, 7 and 8.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the figures by the designation "PP" and the aperture stop is shown by the designation "AS".

As can been seen from Tables 1, 2, 3a–3b, 4, 5a–5e, 6a–6d, 7 and 8, each of the examples has an entrance pupil (exit pupil in Tables 1, 2, 3a–3b, 4, 5a–5e, 6a–6d, 7 and 8) which is telecentric.

Table 10 sets forth the focal lengths of the projection lens of Tables 1, 2, 3a–3b, 4, 5a–5e, 6a–6d, 7 and 8, and of the various lens units and subunits making up those lenses. Table 11 sets forth V-values, Q-values, effective V-values, $|RI1/(Vp/CC1-Vn/CC1)|$ values ($|RI1/\Delta v|$ values in Table 11) and $|RI2/(Vp/CC2-Vn/CC2)|$ values ($|RI2/\Delta v|$ values in Table 11) for the subunits and various of the lens elements of the second lens units of Tables 1, 2, 3a–3b, 4, 5a–5e, 6a–6d, 7 and 8.

The projection lenses of Tables 1, 2, 3a–3b, 4, 5a–5e, 6a–6d, 7 and 8 achieve a distortion which is less than about 0.5% and a lateral color correction which is better than about eight microns over the 440 to 640 nanometer range. They have fields of view in the direction of the long conjugate which are greater than 75 degrees and vignetting levels that are less than 35 percent.

As illustrated by the above examples, the retrofocus type lenses of the invention are well-suited to the manufacture of compact, light weight, projection televisions and monitors which employ pixelized panels. The lenses have flat fields, can be used at f/numbers faster than f/2.4, and can cover extremely wide fields, e.g., total projection angles of up to, for example, 94°, with minimal vignetting and extremely good correction of all aberrations.

Distortion can be controlled to less than 0.2% and primary and secondary lateral color can be as low as one third of a pixel over the range of 0.44–0.64 microns. An MTF in excess of 80% at the pixel frequency can be achieved over the entire field. The lenses can also achieve a high level of thermal stability.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 79.2403 | 4.67000 | ACRYLIC | 81.17 |
| 2 | ac | 21.0583 | 27.64496 | | 54.33 |
| 3 | ac | −683.1154 | 4.00000 | ACRYLIC | 51.02 |
| 4 | ac | 22.0582 | 43.41221 | | 43.52 |
| 5 | | 283.8626 | 8.00000 | S-LAM54 | 51.47 |
| 6 | | −69.0131 | 33.34872 | | 51.57 |
| 7 | | ∞ | 24.36300 | | 29.13 |
| 8 | | Aperture stop | 6.00000 | | 17.07 |
| 9 | | ∞ | 15.43399 | | 18.33 |
| 10 | | −225.2536 | 8.60000 | S-FPL51 | 25.30 |
| 11 | | −17.7460 | 1.40000 | S-LAH64 | 26.46 |
| 12 | | −42.0341 | 3.67465 | | 29.42 |
| 13 | | 47.7023 | 8.50000 | S-FPL51 | 34.73 |
| 14 | | −50.3413 | 0.30000 | | 34.91 |
| 15 | | 51.0000 | 1.70000 | S-LAH64 | 33.40 |
| 16 | | 19.1644 | 12.00000 | S-FPL51 | 30.56 |
| 17 | | −79.2360 | 3.73000 | | 30.36 |
| 18 | | ∞ | 25.00000 | S-BSL7 | 28.80 |
| 19 | | ∞ | 0.22000 | | 23.89 |
| 20 | | ∞ | 3.00000 | FSL3 | 23.82 |
| 21 | | ∞ | 5.77146 | | 23.21 |

Symbol Description
a—Polynomial asphere
c—Conic section
Focal Shift −0.01713

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | −1.6329E−07 | 8.8081E−10 | −5.7917E−13 | −9.2387E−17 | 1.4153E−19 | −2.7383E−23 |
| 2 | 1.7372E−06 | −1.4922E−09 | 6.9657E−12 | 4.7138E−15 | −1.0140E−17 | −1.2935E−20 |

TABLE 1-continued

| | | | | | |
|---|---|---|---|---|---|
| 3 | −4.9706E−06 | −2.3089E−09 | 4.1290E−12 | 6.3611E−15 | −8.5788E−18 | 4.9547E−22 |
| 4 | −9.5107E−06 | −1.1104E−08 | −2.1062E−12 | 2.8865E−14 | 3.7704E−17 | −1.0790E−19 |

First Order Data

| | | | |
|---|---|---|---|
| f/number | 2.39 | Overall Length | 998.428 |
| Magnification | −0.0127 | Forward Vertex Distance | 240.769 |
| Object Height | −845.30 | Barrel Length | 234.998 |
| Object Distance | −757.659 | Entrance Pupil Distance | 36.0035 |
| Effective Focal Length | 10.0787 | Exit Pupil Distance | −1570.55 |
| Image Distance | 5.77146 | Stop Diameter | 16.117 |
| Stop Surface Number | 8 | Distance to Stop | 0.00 |

First Order Properties of Elements

| Element Number | Surface Numbers | | Power | f |
|---|---|---|---|---|
| 1 | 1 | 2 | −0.16760E−01 | −59.666 |
| 2 | 3 | 4 | −0.23151E−01 | −43.194 |
| 3 | 5 | 6 | 0.13569E−01 | 73.696 |
| 4 | 10 | 11 | 0.26232E−01 | 38.121 |
| 5 | 11 | 12 | −0.25130E−01 | −39.794 |
| 6 | 13 | 14 | 0.19764E−01 | 50.597 |
| 7 | 15 | 16 | −0.25187E−01 | −39.703 |
| 8 | 16 | 17 | 0.30990E−01 | 32.269 |

First-Order Properties of Doublets

| Element Number | | Surface Numbers | | Power | f |
|---|---|---|---|---|---|
| 4 | 5 | 10 | 12 | 0.39717E−03 | 2517.8 |
| 7 | 8 | 15 | 17 | 0.66151E−02 | 151.17 |

First Order Properties of the Lens

| Power | f |
|---|---|
| 0.99219E−01 | 10.079 |

TABLE 2

| Surf. No. | Type | Radius | Thickness | Glass | Clear Aperture Diameter |
|---|---|---|---|---|---|
| 1 | a | 292.4304 | 5.00000 | ACRYLIC | 78.14 |
| 2 | ac | 18.5443 | 24.93000 | | 51.05 |
| 3 | ac | −130.7688 | 6.00000 | ACRYLIC | 46.99 |
| 4 | ac | 38.0111 | 39.84000 | | 40.31 |
| 5 | | 160.1220 | 12.20000 | S-LAM55 | 48.02 |
| 6 | | −40.9980 | 3.10000 | S-TIH13 | 48.02 |
| 7 | | −75.7390 | 26.89000 | | 47.90 |
| 8 | | ∞ | 23.80000 | | 40.00 |
| 9 | | Aperture stop | 6.00000 | | 16.17 |
| 10 | | ∞ | 16.71000 | | 16.80 |
| 11 | | −143.4720 | 8.20000 | S-FPL51 | 24.65 |
| 12 | | −17.1970 | 1.59000 | S-LAH64 | 25.82 |
| 13 | | −39.4480 | 2.50000 | | 28.92 |
| 14 | | 40.1860 | 8.00000 | S-PHM52 | 34.01 |
| 15 | | −75.7190 | 0.30000 | | 33.91 |
| 16 | | 68.6180 | 1.84000 | S-LAH52 | 32.37 |
| 17 | | 18.2460 | 12.50000 | S-FPL51 | 29.31 |
| 18 | | −59.6370 | 3.94200 | | 29.26 |
| 19 | | ∞ | 25.00000 | S-BSL7 | 30.00 |
| 20 | | ∞ | 3.00000 | | 30.00 |
| 21 | | ∞ | 3.00000 | S-FSL5 | 24.00 |
| 22 | | ∞ | 0.48300 | | 24.00 |
| 23 | | ∞ | 0.00073 | | 24.00 |

Symbol Description
a—Polynomial asphere
c—Conic section
Focal Shift −0.04300

TABLE 2-continued

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | 1.6442E−06 | 2.2304E−10 | −6.6167E−13 | 1.7362E−16 | 1.3400E−19 | −3.9567E−23 |
| 2 | −5.0929E−06 | −1.2402E−08 | 2.1502E−11 | −1.3932E−14 | −9.7603E−17 | 9.3406E−20 |
| 3 | −1.8351E−05 | 9.1143E−09 | 1.7214E−11 | −8.5963E−15 | −1.3592E−17 | 8.3751E−21 |
| 4 | −3.9702E−06 | 6.5420E−09 | 2.3357E−11 | 4.2269E−14 | −8.6816E−17 | 4.1483E−21 |

First Order Data

| | | | |
|---|---|---|---|
| f/number | 2.39 | Overall Length | 913.676 |
| Magnification | −0.0144 | Forward Vertex Distance | 234.826 |
| Object Height | −739.65 | Barrel Length | 234.825 |
| Object Distance | −678.850 | Entrance Pupil Distance | 30.0774 |
| Effective Focal Length | 10.2394 | Exit Pupil Distance | −1014.92 |
| Image Distance | 0.729327E−03 | Stop Diameter | 16.167 |
| Stop Surface Number | 9 | Distance to Stop | 0.00 |
| Object space f/number | −165.41 | | |

First Order Properties of Elements

| Element Number | Surface Numbers | | Power | f |
|---|---|---|---|---|
| 1 | 1 | 2 | −0.24777E−01 | −40.360 |
| 2 | 3 | 4 | −0.16956E−01 | −58.976 |
| 3 | 5 | 6 | 0.22851E−01 | 43.761 |
| 4 | 6 | 7 | −0.80323E−02 | −124.50 |
| 5 | 11 | 12 | 0.26054E−01 | 38.382 |
| 6 | 12 | 13 | −0.25143E−01 | −39.773 |
| 7 | 14 | 15 | 0.22996E−01 | 43.486 |
| 8 | 16 | 17 | −0.31803E−01 | −31.444 |
| 9 | 17 | 18 | 0.33762E−01 | 29.619 |

First-Order Properties of Doublets

| Element Number | | Surface Numbers | | Power | f |
|---|---|---|---|---|---|
| 3 | 4 | 5 | 7 | 0.14685E−01 | 68.098 |
| 5 | 6 | 11 | 13 | −0.31040E−04 | −32217. |
| 8 | 9 | 16 | 18 | 0.37728E−02 | 265.05 |

First Order Properties of the Lens

| Power | f |
|---|---|
| 0.97662E−01 | 10.239 |

TABLE 3A

| Surf. No. | Type | Radius | Thickness | Glass | Clear Aperture Diameter |
|---|---|---|---|---|---|
| 1 | a | 195.6475 | 5.00000 | ACRYLIC | 80.37 |
| 2 | ac | 17.4828 | 25.58000 | | 51.05 |
| 3 | ac | −1053.4370 | 6.00000 | ACRYLIC | 47.37 |
| 4 | ac | 27.7420 | 35.79000 | | 40.74 |
| 5 | | 186.9600 | 16.04000 | S-BAH27 | 50.14 |
| 6 | | −34.2170 | 3.10000 | S-TIH1 | 50.36 |
| 7 | | −60.3350 | 31.48000 | | 51.11 |
| 8 | | ∞ | 24.00000 | | 29.94 |
| 9 | | Aperture stop | 5.84000 | | 17.47 |
| 10 | | −133.9000 | 3.00000 | S-BSL7 | 17.83 |
| 11 | | −77.6800 | 15.92000 | | 18.38 |

TABLE 3A-continued

| | | | | |
|---|---|---|---|---|
| 12 | −220.0750 | 7.60000 | S-FPL52 | 24.78 |
| 13 | −17.8280 | 1.56000 | S-LAH65 | 25.66 |
| 14 | −43.8930 | 2.44000 | | 28.61 |
| 15 | 47.7700 | 7.70000 | S-PHM53 | 33.32 |
| 16 | −56.1830 | 0.25000 | | 33.45 |
| 17 | 67.4800 | 1.83000 | S-LAH51 | 32.06 |
| 18 | 18.8300 | 12.00000 | S-FPL51 | 29.42 |
| 19 | −57.1350 | 4.00000 | | 29.40 |
| 20 | ∞ | 25.00000 | S-BSL7 | 27.70 |
| 21 | ∞ | 3.00000 | | 23.01 |
| 22 | ∞ | 3.00000 | FSL3 | 22.15 |
| 23 | ∞ | 0.48073 | | 21.56 |

Symbol Description
a—Polynomial asphere
c—Conic section
Focal Shift −0.04800

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | 7.3528E−07 | 4.7642E−10 | −4.1052E−13 | 1.0980E−17 | 9.3193E−20 | −9.4722E−24 |
| 2 | −4.4618E−06 | −1.7205E−08 | 2.2879E−11 | −2.1340E−14 | −7.7601E−17 | 5.6963E−20 |
| 3 | −1.8536E−05 | 3.4871E−09 | 1.6303E−11 | 9.0823E−15 | −1.9046E−17 | −3.3423E−21 |
| 4 | −1.4416E−05 | 2.2218E−08 | −2.0216E−12 | −1.1200E−14 | 2.4330E−16 | −4.1398E−19 |

First Order Data

| | | | |
|---|---|---|---|
| f/number | 2.39 | Overall Length | 959.002 |
| Magnification | −0.0133 | Forward Vertex Distance | 240.611 |
| Object Height | −805.70 | Barrel Length | 240.130 |
| Object Distance | −718.391 | Entrance Pupil Distance | 29.8221 |
| Effective Focal Length | 9.92766 | Exit Pupil Distance | −1162.89 |
| Image Distance | 0.480728 | Stop Diameter | 16.464 |
| Stop Surface Number | 9 | Distance to Stop | 0.00 |

First Order Properties of Elements

| Element Number | Surface Numbers | | Power | f |
|---|---|---|---|---|
| 1 | 1 | 2 | −0.25481E−01 | −39.245 |
| 2 | 3 | 4 | −0.18301E−01 | −54.642 |
| 3 | 5 | 6 | 0.23662E−01 | 42.261 |
| 4 | 6 | 7 | −0.86923E−02 | −115.04 |
| 5 | 10 | 11 | 0.28522E−02 | 350.61 |
| 6 | 12 | 13 | 0.23846E−01 | 41.936 |
| 7 | 13 | 14 | −0.26197E−01 | −38.172 |
| 8 | 15 | 16 | 0.22786E−01 | 43.886 |
| 9 | 17 | 18 | −0.29749E−01 | −33.614 |
| 10 | 18 | 19 | 0.33346E−01 | 29.989 |

First-Order Properties of Doublets

| Element Number | | Surface Numbers | | Power | f |
|---|---|---|---|---|---|
| 3 | 4 | 5 | 7 | 0.14768E−01 | 67.712 |
| 6 | 7 | 12 | 14 | −0.30140E−02 | −331.78 |
| 9 | 10 | 17 | 19 | 0.52758E−02 | 189.55 |

First Order Properties of the Lens

| Power | f |
|---|---|
| 0.10073 | 9.9277 |

TABLE 3B

| Surf. No. | Type | Radius | Thickness | Glass | Clear Aperture Diameter |
|---|---|---|---|---|---|
| 1 | a | 165.1257 | 5.00000 | ACRYLIC | 81.90 |
| 2 | ac | 20.9729 | 25.17902 | | 54.30 |
| 3 | ac | −487.0656 | 7.00000 | ACRYLIC | 49.57 |
| 4 | ac | 24.7445 | 36.49893 | | 41.73 |
| 5 | | 312.8584 | 17.00000 | S-BAH28 | 51.23 |
| 6 | | −31.9325 | 3.00000 | S-TIH10 | 51.58 |
| 7 | | −58.8083 | 25.92929 | | 52.87 |
| 8 | | ∞ | 24.00000 | | 34.55 |
| 9 | | Aperture stop | 8.50000 | | 21.56 |
| 10 | | ∞ | 15.55149 | | 21.34 |
| 11 | | −180.0000 | 4.00000 | S-FPL51 | 27.83 |
| 12 | | −68.8387 | 0.82098 | | 28.99 |
| 13 | | −160.0000 | 8.80000 | S-FPL51 | 29.60 |
| 14 | | −21.5804 | 1.40000 | S-LAH55 | 30.56 |
| 15 | | −56.2356 | 0.30000 | | 33.56 |
| 16 | | 45.2733 | 9.00000 | S-BSM16 | 37.36 |
| 17 | | −91.0958 | 0.30000 | | 37.26 |
| 18 | | 56.0000 | 1.70000 | S-LAH55 | 35.60 |
| 19 | | 20.3047 | 13.50000 | S-FPL51 | 32.34 |
| 20 | | −69.6734 | 3.50000 | | 32.13 |
| 21 | | ∞ | 1.50000 | S-BSL7 | 30.32 |
| 22 | | ∞ | 1.00000 | | 29.99 |
| 23 | | ∞ | 25.00000 | S-BAL35 | 29.65 |
| 24 | | ∞ | 1.00000 | | 24.41 |
| 25 | | ∞ | 1.50000 | S-BSL7 | 24.07 |
| 26 | | ∞ | 2.55000 | | 23.75 |
| 27 | | ∞ | 0.70000 | S-BSL7 | 22.89 |
| 28 | | ∞ | 0.48081 | | 22.73 |

Symbol Description
a—polynomial asphere
c—Conic section
Focal Shift −0.04000

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | 1.1118E−06 | 7.0652E−10 | −3.8482E−13 | −1.3640E−16 | 6.7221E−20 | 1.2999E−23 |
| 2 | −2.1782E−06 | −2.2941E−09 | 7.5490E−12 | 7.2025E−15 | −1.4488E−17 | −2.0320E−20 |
| 3 | −8.0401E−06 | 3.8691E−09 | 3.2911E−12 | −6.4601E−15 | −1.6056E−17 | 1.6963E−20 |
| 4 | −3.7959E−06 | 6.5386E−09 | −2.1568E−11 | 3.2886E−14 | 6.2530E−18 | −6.8868E−20 |

First Order Data

| | | | |
|---|---|---|---|
| f/number | 2.00 | Overall Length | 897.646 |
| Magnification | −0.0152 | Forward Vertex Distance | 244.711 |
| Object Height | −741.81 | Barrel Length | 244.230 |
| Object Distance | −652.936 | Entrance Pupil Distance | 32.5912 |
| Effective Focal Length | 10.4400 | Exit Pupil Distance | −2711.51 |
| Image Distance | 0.480811 | Stop Diameter | 20.322 |
| Stop Surface Number | 9 | Distance to Stop | 0.00 |

First Order Properties of Elements

| Element Number | Surface Numbers | | Power | f |
|---|---|---|---|---|
| 1 | 1 | 2 | −0.20318E−01 | −49.218 |
| 2 | 3 | 4 | −0.21064E−01 | −47.475 |
| 3 | 5 | 6 | 0.24601E−01 | 40.649 |
| 4 | 6 | 7 | −0.10012E−01 | −99.879 |
| 5 | 11 | 12 | 0.45252E−02 | 220.98 |
| 6 | 13 | 14 | 0.20405E−01 | 49.008 |
| 7 | 14 | 15 | −0.23529E−01 | −42.500 |
| 8 | 16 | 17 | 0.20074E−01 | 49.817 |
| 9 | 18 | 19 | −0.25780E−01 | −38.790 |

TABLE 3B-continued

| 10 | 19 | 20 | 0.30121E-01 | 33.200 |

First-Order Properties of Doublets

| Element Number | | Surface Numbers | | Power | f |
|---|---|---|---|---|---|
| 3 | 4 | 5 | 7 | 0.14287E-01 | 69.996 |
| 6 | 7 | 13 | 15 | −0.37869E-02 | −264.06 |
| 9 | 10 | 18 | 20 | 0.55851E-02 | 179.05 |

First Order Properties of the Lens

| Power | f |
|---|---|
| 0.95786E-01 | 10.440 |

TABLE 4

| Surf. No. | Type | Radius | Thickness | Glass | Clear Aperture Diameter |
|---|---|---|---|---|---|
| 1 | ac | 447.5631 | 6.50000 | ACRYLIC | 77.95 |
| 2 | ac | 18.9921 | 24.42521 | | 47.80 |
| 3 | ac | −98.7960 | 5.00000 | ACRYLIC | 42.86 |
| 4 | ac | 25.7576 | 18.20150 | | 36.06 |
| 5 | | −238.2862 | 2.80000 | S-PHM52 | 37.80 |
| 6 | | 46.1970 | 10.00000 | S-LAH60 | 39.09 |
| 7 | | −66.8182 | 29.35394 | | 39.18 |
| 8 | | ∞ | 30.00000 | | 25.34 |
| 9 | | Aperture stop | 4.81498 | | 15.67 |
| 10 | | ∞ | 5.70000 | | 16.81 |
| 11 | | 748.1551 | 6.80000 | S-FPL51 | 18.76 |
| 12 | | −14.4385 | 1.20000 | S-LAH65 | 19.41 |
| 13 | | 410.3233 | 0.20000 | | 21.87 |
| 14 | | 52.5480 | 6.80000 | S-BSM28 | 23.29 |
| 15 | | −26.1804 | 0.20000 | | 24.24 |
| 16 | | −3176.8780 | 1.20000 | S-LAH65 | 24.19 |
| 17 | | 19.7141 | 9.00000 | S-FPL51 | 24.16 |
| 18 | | −45.6452 | 0.20000 | | 25.22 |
| 19 | | 27.0537 | 6.50000 | S-NSL3 | 26.45 |
| 20 | | −105.1618 | 4.00000 | | 25.92 |
| 21 | | ∞ | 30.50000 | BK7 | 23.79 |
| 22 | | ∞ | 4.00000 | | 16.97 |
| 23 | | ∞ | 3.00000 | S-FSL5 | 15.65 |
| 24 | | ∞ | 0.43488 | | 14.99 |

Symbol Description
a—Polynomial asphere
c—Conic section
Focal Shift −0.02285

Conics

| Surface Number | Constant |
|---|---|
| 1 | −1.0000E+00 |
| 2 | −1.0000E+00 |
| 3 | −1.0000E+00 |
| 4 | −1.0000E+00 |

Even Polynomial Aspheres

| Surf. No. | D | E | F | G | H | I |
|---|---|---|---|---|---|---|
| 1 | 2.1969E-06 | 2.9936E-11 | −2.6514E-15 | −2.0313E-17 | −5.2891E-20 | 2.9129E-23 |
| 2 | 3.5159E-07 | 2.7713E-09 | 1.9561E-11 | 6.0035E-15 | −1.2653E-17 | −1.1696E-20 |
| 3 | −7.5100E-06 | 8.6419E-09 | 1.4519E-11 | −2.3027E-14 | −2.9317E-17 | 3.9803E-20 |
| 4 | 8.6601E-06 | −2.9508E-08 | 1.1144E-10 | 3.5937E-14 | −5.5560E-16 | 4.6766E-19 |

First Order Data

| f/number | 2.00 | Overall Length | 829.957 |
|---|---|---|---|
| Magnification | −0.0104 | Forward Vertex Distance | 210.831 |
| Object Height | −714.34 | Barrel Length | 210.396 |

TABLE 4-continued

| | | | |
|---|---|---|---|
| Object Distance | −619.126 | Entrance Pupil Distance | 29.4171 |
| Effective Focal Length | 6.74119 | Exit Pupil Distance | −1121.05 |
| Image Distance | 0.434879 | Stop Diameter | 14.750 |
| Stop Surface Number | 9 | Distance to Stop | 0.00 |

First Order Properties of Elements

| Element Number | Surface Numbers | | Power | f |
|---|---|---|---|---|
| 1 | 1 | 2 | −0.24771E−01 | −40.370 |
| 2 | 3 | 4 | −0.24489E−01 | −40.835 |
| 3 | 5 | 6 | −0.16092E−01 | −62.145 |
| 4 | 6 | 7 | 0.29489E−01 | 33.911 |
| 5 | 11 | 12 | 0.35084E−01 | 28.503 |
| 6 | 12 | 13 | −0.58011E−01 | −17.238 |
| 7 | 14 | 15 | 0.34344E−01 | 29.117 |
| 8 | 16 | 17 | −0.41253E−01 | −24.241 |
| 9 | 17 | 18 | 0.34546E−01 | 28.947 |
| 10 | 19 | 20 | 0.23774E−01 | 42.063 |

First-Order Properties of Doublets

| Element Number | | Surface Numbers | | Power | f |
|---|---|---|---|---|---|
| 3 | 4 | 5 | 7 | 0.14629E−01 | 68.358 |
| 5 | 6 | 11 | 13 | −0.22706E−01 | −44.042 |
| 8 | 9 | 16 | 18 | −0.39951E−02 | −250.31 |

First Order Properties of the Lens

| Power | f |
|---|---|
| 0.14834 | 6.7412 |

TABLE 5A

| Surf. No. | Type | Radius | Thickness | Glass | Clear Aperture Diameter |
|---|---|---|---|---|---|
| 1 | ac | 57.4987 | 5.00000 | ACRYLIC | 76.78 |
| 2 | ac | 21.2987 | 31.96830 | | 56.65 |
| 3 | | −115.7431 | 2.40000 | S-PHM53 | 40.43 |
| 4 | | 26.9381 | 35.74898 | | 34.54 |
| 5 | | 62.8213 | 6.00000 | S-NBH8 | 35.86 |
| 6 | | −160.5358 | 22.00000 | | 35.32 |
| 7 | | ∞ | 17.28601 | | 23.44 |
| 8 | | Aperture stop | 1.79865 | | 17.71 |
| 9 | | ∞ | 10.00000 | | 17.86 |
| 10 | | −118.9178 | 7.00000 | S-FPL51 | 20.20 |
| 11 | | −19.5721 | 1.40000 | S-LAH55 | 21.44 |
| 12 | | −53.8513 | 10.16336 | | 23.05 |
| 13 | | 197.4438 | 6.08204 | S-FPL51 | 30.50 |
| 14 | | −45.2466 | 0.30000 | | 31.51 |
| 15 | | 206.2564 | 1.80000 | S-LAH66 | 32.29 |
| 16 | | 36.4127 | 8.03756 | S-FPL51 | 32.53 |
| 17 | | −76.5915 | 0.30000 | | 33.13 |
| 18 | | 42.4284 | 5.80000 | S-FPL51 | 34.01 |
| 19 | | −349.1355 | 3.00000 | | 33.67 |
| 20 | | ∞ | 27.00000 | S-BSL7 | 32.54 |
| 21 | | ∞ | 4.24000 | PBH71 | 26.69 |
| 22 | | ∞ | 20.00000 | PBH56 | 25.97 |
| 23 | | ∞ | 0.25000 | 541479* | 22.43 |
| 24 | | ∞ | 0.10000 | | 22.38 |
| 25 | | ∞ | 0.50000 | 835473** | 22.34 |
| 26 | | ∞ | 0.44000 | POLYCARB | 22.26 |
| 27 | | ∞ | 2.00000 | | 22.17 |
| 28 | | ∞ | 1.10000 | S-BSL7 | 21.51 |
| 29 | | ∞ | 0.00328 | | 21.27 |

*V = 47.9 for a central wavelength of 546.1 nm and blue and red wavelengths of 465 nm and 630 nm, respectively.
N = 1.541 for 546.1 nm.
**V = 47.3 for a central wavelength of 546.1 nm and blue and red wavelengths of 465 nm and 630 nm, respectively.

TABLE 5A-continued

N = 1.835 for 546.1 nm.
Symbol Description
a—Polynomial asphere
c—Conic section
Focal Shift −0.04532

Conics

| Surface Number | Constant |
|---|---|
| 1 | 7.4400E−01 |
| 2 | −8.8090E−01 |

Even Polynomial Aspheres

| Surf. No. | D | E | F | G | H | I |
|---|---|---|---|---|---|---|
| 1 | −6.487848E−06 | 5.692129E−09 | −9.029040E−13 | −2.789730E−15 | 1.962190E−18 | −4.460521E−22 |
| 2 | −4.916666E−06 | −1.933047E−09 | 1.627059E−11 | 6.612435E−15 | −4.638377E−17 | 2.784981E−20 |

First Order Data

| | | | |
|---|---|---|---|
| f/number | 2.30 | Overall Length | 1261.81 |
| Magnification | −0.0107 | Forward Vertex Distance | 231.718 |
| Object Height | −995.40 | Barrel Length | 231.715 |
| Object Distance | −1030.09 | Entrance Pupil Distance | 38.3934 |
| Effective Focal Length | 11.3977 | Exit Pupil Distance | −1499.55 |
| Image Distance | 0.327928E−02 | Stop Diameter | 16.952 |
| Stop Surface Number | 8 | Distance to Stop | 0.00 |

First Order Properties of Elements

| Element Number | Surface Numbers | | Power | f |
|---|---|---|---|---|
| 1 | 1 | 2 | −0.13929E−01 | −71.790 |
| 2 | 3 | 4 | −0.27871E−01 | −35.880 |
| 3 | 5 | 6 | 0.15884E−01 | 62.957 |
| 4 | 10 | 11 | 0.21775E−01 | 45.925 |
| 5 | 11 | 12 | −0.26793E−01 | −37.323 |
| 6 | 13 | 14 | 0.13428E−01 | 74.471 |
| 7 | 15 | 16 | −0.17472E−01 | −57.233 |
| 8 | 16 | 17 | 0.19719E−01 | 50.712 |
| 9 | 18 | 19 | 0.13111E−01 | 76.273 |

First-Order Properties of Doublets

| Element Number | | Surface Numbers | | Power | f |
|---|---|---|---|---|---|
| 4 | 5 | 10 | 12 | −0.58013E−02 | −172.38 |
| 7 | 8 | 15 | 17 | 0.27815E−02 | 359.52 |

First Order Properties of the Lens

| Power | f |
|---|---|
| 0.87737E−01 | 11.398 |

TABLE 5B

| Surf. No. | Type | Radius | Thickness | Glass | Clear Aperture Diameter |
|---|---|---|---|---|---|
| 1 | ac | 197.4654 | 6.50000 | ACRYLIC | 81.11 |
| 2 | ac | 23.6835 | 29.26290 | | 52.30 |
| 3 | ac | −74.7270 | 5.50000 | ACRYLIC | 40.87 |
| 4 | ac | 17.4400 | 29.38195 | | 33.11 |
| 5 | | 124.2170 | 6.50000 | S-LAH60 | 37.94 |
| 6 | | −77.7762 | 26.90522 | | 37.97 |
| 7 | | ∞ | 30.00000 | | 25.68 |
| 8 | | Aperture stop | 5.09750 | | 14.68 |
| 9 | | ∞ | 5.20000 | | 17.20 |
| 10 | | 170.9967 | 7.50000 | S-FPL51 | 20.21 |
| 11 | | −15.5011 | 1.20000 | S-LAH55 | 21.17 |

TABLE 5B-continued

| | | | | |
|---|---:|---:|---|---:|
| 12 | −211.5709 | 0.70000 | | 24.02 |
| 13 | 81.2858 | 7.20000 | S-BSM22 | 26.19 |
| 14 | −28.0473 | 0.50000 | | 27.31 |
| 15 | 221.0186 | 1.20000 | S-LAH66 | 27.39 |
| 16 | 20.8955 | 9.50000 | S-FPL51 | 27.14 |
| 17 | −62.9428 | 0.20000 | | 28.00 |
| 18 | 24.9626 | 7.20000 | S-FSL5 | 29.40 |
| 19 | −298.2141 | 6.50000 | | 28.72 |
| 20 | ∞ | 16.50000 | BK7 | 24.90 |
| 21 | ∞ | 5.00000 | | 18.99 |
| 22 | ∞ | 3.00000 | COR-7056 | 16.19 |
| 23 | ∞ | 0.48302 | | 15.11 |

Symbol Description
a—Polynomial asphere
c—Conic section
Focal Shift −0.01500

Conics

| Surface Number | Constant |
|---:|---:|
| 1 | −1.0000E+00 |
| 2 | −1.0000E+00 |
| 3 | −1.0000E+00 |
| 4 | −1.0000E+00 |

Even Polynomial Aspheres

| Surf. No. | D | E | F | G | H | I |
|---:|---:|---:|---:|---:|---:|---:|
| 1 | 1.648991E−06 | 1.655879E−10 | 9.524199E−14 | −2.780989E−17 | −4.539450E−20 | 2.788191E−23 |
| 2 | 1.649921E−06 | −6.886888E−10 | 1.581826E−11 | −3.767076E−15 | −9.937468E−18 | 1.191421E−20 |
| 3 | −5.400523E−06 | 4.698744E−09 | 6.843361E−13 | −6.065264E−15 | 2.170843E−17 | −3.502293E−20 |
| 4 | 4.376637E−06 | −4.418084E−08 | 1.300320E−10 | −1.313411E−13 | 1.437826E−16 | −4.881906E−19 |

First Order Data

| | | | |
|---|---:|---|---:|
| f/number | 2.00 | Overall Length | 829.996 |
| Magnification | −0.0104 | Forward Vertex Distance | 211.031 |
| Object Height | −714.34 | Barrel Length | 210.548 |
| Object Distance | −618.965 | Entrance Pupil Distance | 33.7008 |
| Effective Focal Length | 6.78395 | Exit Pupil Distance | −941.888 |
| Image Distance | 0.483023 | Stop Diameter | 14.677 |
| Stop Surface Number | 8 | Distance to Stop | 0.00 |

First Order Properties of Elements

| Element Number | Surface Numbers | | Power | f |
|---:|---:|---:|---:|---:|
| 1 | 1 | 2 | −0.18122E−01 | −55.183 |
| 2 | 3 | 4 | −0.35609E−01 | −28.082 |
| 3 | 5 | 6 | 0.17291E−01 | 57.835 |
| 4 | 10 | 11 | 0.34602E−01 | 28.900 |
| 5 | 11 | 12 | −0.50046E−01 | −19.981 |
| 6 | 13 | 14 | 0.29217E−01 | 34.226 |
| 7 | 15 | 16 | −0.33547E−01 | −29.809 |
| 8 | 16 | 17 | 0.30576E−01 | 32.705 |
| 9 | 18 | 19 | 0.21080E−01 | 47.438 |

First-Order Properties of Doublets

| Element Number | | Surface Numbers | | Power | f |
|---:|---:|---:|---:|---:|---:|
| 4 | 5 | 10 | 12 | −0.14804E−01 | −67.550 |
| 7 | 8 | 15 | 17 | −0.13591E−02 | −735.76 |

First Order Properties of the Lens

| Power | f |
|---:|---:|
| 0.14741 | 6.7840 |

TABLE 5C

| Surf. No. | Type | Radius | Thickness | Glass | Clear Aperture Diameter |
|---|---|---|---|---|---|
| 1 | ac | 359.6287 | 6.50000 | ACRYLIC | 85.93 |
| 2 | ac | 22.9087 | 33.97886 | | 54.12 |
| 3 | ac | −77.5970 | 6.50000 | ACRYLIC | 47.05 |
| 4 | ac | 26.5091 | 28.88589 | | 43.35 |
| 5 | | 259.5916 | 9.00000 | S-LAH60 | 53.98 |
| 6 | | −69.7610 | 1.00000 | | 54.31 |
| 7 | | ∞ | 82.78150 | | 51.30 |
| 8 | | Aperture stop | 10.49429 | | 14.37 |
| 9 | | −126.3090 | 4.00000 | S-FSL5 | 15.71 |
| 10 | | −17.7188 | 1.20000 | S-LAH60 | 16.23 |
| 11 | | −141.5408 | 1.00000 | | 17.42 |
| 12 | | 327.7284 | 3.50000 | S-BSM22 | 18.35 |
| 13 | | −30.9934 | 10.14421 | | 19.04 |
| 14 | | 55.8765 | 1.20000 | S-LAH66 | 22.34 |
| 15 | | 26.8653 | 5.50000 | S-FSL5 | 22.27 |
| 16 | | −75.5073 | 0.20000 | | 22.59 |
| 17 | | 31.6739 | 4.50000 | S-FSL5 | 22.79 |
| 18 | | −209.7605 | 4.24000 | | 22.40 |
| 19 | | ∞ | 25.00000 | SK2 | 21.09 |
| 20 | | ∞ | 4.24000 | | 16.64 |
| 21 | | ∞ | 3.00000 | S-NSL5 | 15.43 |
| 22 | | ∞ | 0.00000 | | 14.86 |
| 23 | | ∞ | 3.00000 | COR-7056 | 14.86 |
| 24 | | ∞ | 0.00011 | | 14.29 |

Symbol Description
a—Polynomial asphere
c—Conic section
Focal Shift −0.01734

Conics

| Surface Number | Constant |
|---|---|
| 1 | −1.0000E+00 |
| 2 | −1.0000E+00 |
| 3 | −1.0000E+00 |
| 4 | −1.0000E+00 |

Even Polynomial Aspheres

| Surf. No. | D | E | F | G | H | I |
|---|---|---|---|---|---|---|
| 1 | 1.528519E−06 | 3.448567E−12 | −4.292583E−14 | −3.619658E−17 | −1.701987E−20 | 1.314269E−23 |
| 2 | 2.109818E−06 | 3.023642E−09 | 9.492966E−12 | −1.157716E−15 | −3.565703E−18 | 4.268935E−21 |
| 3 | −2.425213E−06 | 5.080445E−09 | 2.418222E−12 | −6.174929E−15 | −2.645332E−18 | −5.539453E−21 |
| 4 | 2.375087E−06 | −2.036229E−08 | 7.245023E−11 | −9.508187E−14 | −3.796912E−17 | 1.020897E−19 |

First Order Data

| | | | |
|---|---|---|---|
| f/number | 2.40 | Overall Length | 864.052 |
| Magnification | −0.0108 | Forward Vertex Distance | 249.865 |
| Object Height | −660.40 | Barrel Length | 249.865 |
| Object Distance | −614.188 | Entrance Pupil Distance | 35.7890 |
| Effective Focal Length | 7.02569 | Exit Pupil Distance | −965.964 |
| Image Distance | 0.110872E−03 | Stop Diameter | 12.861 |
| Stop Surface Number | 8 | Distance to Stop | 0.00 |

First Order Properties of Elements

| Element Number | Surface Numbers | | Power | f |
|---|---|---|---|---|
| 1 | 1 | 2 | −0.20052E−01 | −49.870 |
| 2 | 3 | 4 | −0.25506E−01 | −39.207 |
| 3 | 5 | 6 | 0.15074E−01 | 66.338 |
| 4 | 9 | 10 | 0.24021E−01 | 41.631 |
| 5 | 10 | 11 | −0.41256E−01 | −24.239 |
| 6 | 12 | 13 | 0.21993E−01 | 45.470 |
| 7 | 14 | 15 | −0.14730E−01 | −67.889 |
| 8 | 15 | 16 | 0.24250E−01 | 41.237 |
| 9 | 17 | 18 | 0.17666E−01 | 56.605 |

TABLE 5C-continued

First-Order Properties of Doublets

| Element Number | | Surface Numbers | | Power | f' |
|---|---|---|---|---|---|
| 4 | 5 | 9 | 11 | −0.17757E−01 | −56.315 |
| 7 | 8 | 14 | 16 | 0.96448E−02 | 103.68 |

First Order Properties of the Lens

| Power | f' |
|---|---|
| 0.14233 | 7.0257 |

TABLE 5D

| Surf. No. | Type | Radius | Thickness | Glass | Clear Aperture Diameter |
|---|---|---|---|---|---|
| 1 | ac | 143.8080 | 6.50000 | ACRYLIC | 83.86 |
| 2 | ac | 24.8270 | 31.73394 | | 55.42 |
| 3 | ac | −93.6360 | 5.00000 | ACRYLIC | 41.89 |
| 4 | ac | 18.5567 | 36.63995 | | 33.57 |
| 5 | | 145.3704 | 6.50000 | S-LAH60 | 40.28 |
| 6 | | −78.0590 | 20.07211 | | 40.31 |
| 7 | | ∞ | 30.00000 | | 29.59 |
| 8 | | Aperture stop | 6.22434 | | 15.44 |
| 9 | | ∞ | 5.20000 | | 17.98 |
| 10 | | −88.7908 | 6.60000 | S-FPL51 | 20.41 |
| 11 | | −15.2122 | 1.20000 | S-LAH60 | 21.59 |
| 12 | | −83.8144 | 0.70000 | | 24.84 |
| 13 | | 112.2493 | 6.50000 | S-PHM52 | 27.43 |
| 14 | | −31.5608 | 0.61279 | | 28.52 |
| 15 | | 53.0040 | 1.20000 | S-LAH66 | 29.61 |
| 16 | | 23.2202 | 10.00000 | S-FPL51 | 28.97 |
| 17 | | −56.3548 | 0.20000 | | 29.30 |
| 18 | | 29.3936 | 5.50000 | S-NSL36 | 28.69 |
| 19 | | 150.5620 | 5.03248 | | 27.65 |
| 20 | | ∞ | 16.50000 | BK7 | 25.15 |
| 21 | | ∞ | 5.00000 | | 19.09 |
| 22 | | ∞ | 3.00000 | COR-7056 | 16.24 |
| 23 | | ∞ | 0.48323 | | 15.12 |

Symbol Description
a—Polynomial asphere
c—Conic section
Focal Shift −0.01500

Conics

| Surface Number | Constant |
|---|---|
| 1 | −1.0000E+00 |
| 2 | −1.0000E+00 |
| 3 | −1.0000E+00 |
| 4 | −1.0000E+00 |

Even Polynomial Aspheres

| Surf. No. | D | E | F | G | H | I |
|---|---|---|---|---|---|---|
| 1 | 1.573296E−06 | 1.084597E−10 | 7.507104E−14 | −3.717748E−17 | −5.678730E−20 | 2.925330E−23 |
| 2 | 2.763696E−06 | −2.069976E−09 | 1.670854E−11 | −4.259983E−15 | −1.309383E−17 | 7.756839E−21 |
| 3 | −5.272663E−06 | 6.008307E−09 | 9.992468E−13 | −7.414077E−15 | 1.731344E−17 | −3.145772E−20 |
| 4 | 7.421035E−06 | −4.357193E−08 | 1.349906E−10 | −8.954613E−14 | 2.181588E−16 | −1.027464E−18 |

First Order Data

| | | | |
|---|---|---|---|
| f/number | 2.00 | Overall Length | 829.999 |
| Magnification | −0.0104 | Forward Vertex Distance | 210.399 |
| Object Height | −714.34 | Barrel Length | 209.916 |
| Object Distance | −619.600 | Entrance Pupil Distance | 36.3261 |
| Effective Focal Length | 6.81811 | Exit Pupil Distance | −1934.91 |

TABLE 5D-continued

| Image Distance | 0.483231 | Stop Diameter | 13.977 |
|---|---|---|---|
| Stop Surface Number | 8 | Distance to Stop | 0.00 |

First Order Properties of Elements

| Element Number | Surface Numbers | | Power | f |
|---|---|---|---|---|
| 1 | 1 | 2 | −0.16158E−01 | −61.889 |
| 2 | 3 | 4 | −0.32352E−01 | −30.910 |
| 3 | 5 | 6 | 0.16307E−01 | 61.325 |
| 4 | 10 | 11 | 0.27963E−01 | 35.761 |
| 5 | 11 | 12 | −0.44799E−01 | −22.322 |
| 6 | 13 | 14 | 0.24746E−01 | 40.411 |
| 7 | 15 | 16 | −0.18453E−01 | −54.192 |
| 8 | 16 | 17 | 0.29044E−01 | 34.430 |
| 9 | 18 | 19 | 0.14452E−01 | 69.196 |

First-Order Properties of Doublets

| Element Number | | Surface Numbers | | Power | f |
|---|---|---|---|---|---|
| 4 | 5 | 10 | 12 | −0.18127E−01 | −55.167 |
| 7 | 8 | 15 | 17 | 0.11393E−01 | 87.773 |

First Order Properties of the Lens

| Power | f |
|---|---|
| 0.14667 | 6.8181 |

TABLE 5E

| Surf. No. | Type | Radius | Thickness | Glass | Clear Aperture Diameter |
|---|---|---|---|---|---|
| 1 | ac | 211.0907 | 6.50000 | ACRYLIC | 87.41 |
| 2 | ac | 23.9799 | 34.31563 | | 56.98 |
| 3 | ac | −71.6814 | 5.50000 | ACRYLIC | 46.20 |
| 4 | ac | 25.4075 | 32.89334 | | 40.41 |
| 5 | | 153.8035 | 8.00000 | S-LAH60 | 49.63 |
| 6 | | −88.6562 | 1.00000 | | 49.70 |
| 7 | | ∞ | 79.06017 | | 47.52 |
| 8 | | Aperture stop | 8.95970 | | 14.08 |
| 9 | | −146.6234 | 4.50000 | S-FSL5 | 17.22 |
| 10 | | −19.5596 | 1.20000 | S-LAH60 | 18.11 |
| 11 | | −125.0379 | 1.00000 | | 19.55 |
| 12 | | −195.1786 | 4.00000 | S-BSM22 | 20.44 |
| 13 | | −34.4484 | 8.68541 | | 21.74 |
| 14 | | 49.6446 | 1.20000 | S-LAH60 | 26.99 |
| 15 | | 29.6029 | 7.50000 | S-FSL5 | 26.90 |
| 16 | | −60.8387 | 0.20000 | | 27.44 |
| 17 | | 32.0703 | 6.00000 | S-FSL5 | 27.79 |
| 18 | | −220.3389 | 4.24000 | | 27.17 |
| 19 | | ∞ | 25.00000 | SK2 | 25.04 |
| 20 | | ∞ | 4.24000 | | 18.03 |
| 21 | | ∞ | 3.00000 | S-NSL5 | 16.09 |
| 22 | | ∞ | 0.00000 | | 15.20 |
| 23 | | ∞ | 3.00000 | COR-7056 | 15.20 |
| 24 | | ∞ | 0.00059 | | 14.29 |

Symbol Description
a—Polynomial asphere
c—Conic section
Focal Shift −0.01620

Conics

| Surface Number | Constant |
|---|---|
| 1 | −1.0000E+00 |
| 2 | −1.0000E+00 |
| 3 | −1.0000E+00 |
| 4 | −1.0000E+00 |

TABLE 5E-continued

Even Polynomial Aspheres

| Surf. No. | D | E | F | G | H | I |
|---|---|---|---|---|---|---|
| 1 | 1.348371E−06 | 1.492361E−11 | −3.574956E−15 | −1.712115E−17 | −1.443669E−20 | 9.167589E−24 |
| 2 | 1.702046E−06 | 9.691752E−10 | 8.188587E−12 | −2.523602E−15 | −4.950958E−18 | 2.623718E−21 |
| 3 | −3.434067E−06 | 4.490748E−09 | −3.256203E−13 | −5.771461E−15 | 3.728715E−18 | −2.842311E−21 |
| 4 | 3.543911E−06 | −2.219630E−08 | 7.691450E−11 | −8.934695E−14 | −4.171831E−17 | 9.807816E−20 |

First Order Data

| | | | |
|---|---|---|---|
| f/number | 2.40 | Overall Length | 864.204 |
| Magnification | −0.0108 | Forward Vertex Distance | 249.995 |
| Object Height | −660.40 | Barrel Length | 249.994 |
| Object Distance | −614.209 | Entrance Pupil Distance | 37.3474 |
| Effective Focal Length | 7.04277 | Exit Pupil Distance | −975.757 |
| Image Distance | 0.591711E−03 | Stop Diameter | 12.708 |
| Stop Surface Number | 8 | Distance to Stop | 0.00 |

First Order Properties of Elements

| Element Number | Surface Numbers | | Power | f |
|---|---|---|---|---|
| 1 | 1 | 2 | −0.18042E−01 | −55.425 |
| 2 | 3 | 4 | −0.26816E−01 | −37.292 |
| 3 | 5 | 6 | 0.14699E−01 | 68.030 |
| 4 | 9 | 10 | 0.21924E−01 | 45.612 |
| 5 | 10 | 11 | −0.36010E−01 | −27.770 |
| 6 | 12 | 13 | 0.15086E−01 | 66.287 |
| 7 | 14 | 15 | −0.11133E−01 | −89.821 |
| 8 | 15 | 16 | 0.23895E−01 | 41.851 |
| 9 | 17 | 18 | 0.17336E−01 | 57.684 |

First-Order Properties of Doublets

| Element Number | | Surface Numbers | | Power | f |
|---|---|---|---|---|---|
| 4 | 5 | 9 | 11 | −0.14545E−01 | −68.750 |
| 7 | 8 | 14 | 16 | 0.12949E−01 | 77.229 |

First Order Properties of the Lens

| Power | f |
|---|---|
| 0.14199 | 7.0428 |

TABLE 6A

| Surf. No. | Type | Radius | Thickness | Glass | Clear Aperture Diameter |
|---|---|---|---|---|---|
| 1 | ac | 65.3853 | 6.50000 | ACRYLIC | 70.56 |
| 2 | ac | 19.0716 | 23.26755 | | 47.26 |
| 3 | | −630.9500 | 2.50000 | S-PHM52 | 37.41 |
| 4 | | 20.0700 | 37.72846 | | 29.60 |
| 5 | | ∞ | 25.00000 | | 24.25 |
| 6 | | 58.1700 | 3.00000 | S-TIH6 | 19.83 |
| 7 | | −714.8000 | 11.35599 | | 19.31 |
| 8 | | Aperture stop | 16.40409 | | 15.13 |
| 9 | | 93.7000 | 4.00000 | S-FPL51 | 16.65 |
| 10 | | −19.1000 | 1.00000 | S-LAH55 | 16.94 |
| 11 | | 54.7600 | 1.00000 | | 18.20 |
| 12 | | 34.5900 | 5.20000 | S-FSL5 | 19.99 |
| 13 | | −34.5900 | 0.50000 | | 20.83 |
| 14 | | 69.5000 | 1.20000 | S-LAH52 | 21.66 |
| 15 | | 19.5880 | 7.20000 | 498575* | 21.71 |
| 16 | | −67.6820 | 0.20000 | | 22.61 |
| 17 | | 32.0000 | 6.22000 | S-FSL5 | 23.60 |
| 18 | | −64.8138 | 6.00000 | | 23.38 |
| 19 | | ∞ | 23.00000 | BK7 | 21.30 |
| 20 | | ∞ | 5.50000 | | 16.85 |

TABLE 6A-continued

| | | | | |
|---|---|---|---|---|
| 21 | ∞ | 3.00000 | COR-7056 | 15.22 |
| 22 | ∞ | 0.48107 | | 14.63 |

*V = 57.5 for a central wavelength of 546.1 nm and blue and red wavelengths of 440 nm and 640 nm, respectively.
N = 1.498 for 546.1 nm.
Symbol Description
a—Polynomial asphere
c—Conic section
Focal Shift −0.02659

Conics

| Surface Number | Constant |
|---|---|
| 1 | −1.0000E+00 |
| 2 | −1.0000E+00 |

Even Polynomial Aspheres

| Surf. No. | D | E | F | G | H | I |
|---|---|---|---|---|---|---|
| 1 | 1.198270E−06 | 7.655854E−11 | 6.670201E−13 | −4.989290E−17 | −1.950617E−19 | 1.269622E−22 |
| 2 | 6.217412E−06 | 2.129863E−09 | 2.974131E−12 | −2.250075E−14 | 1.068665E−16 | −1.191990E−19 |

First Order Data

| | | | |
|---|---|---|---|
| f/number | 2.40 | Overall Length | 789.626 |
| Magnification | −0.0106 | Forward Vertex Distance | 190.257 |
| Object Height | −685.55 | Barrel Length | 189.776 |
| Object Distance | −599.369 | Entrance Pupil Distance | 31.7172 |
| Effective Focal Length | 6.67367 | Exit Pupil Distance | −681.747 |
| Image Distance | 0.481071 | Stop Diameter | 14.287 |
| Stop Surface Number | 8 | Distance to Stop | 0.00 |

First Order Properties of Elements

| Element Number | Surface Numbers | | Power | f |
|---|---|---|---|---|
| 1 | 1 | 2 | −0.17488E−01 | −57.182 |
| 2 | 3 | 4 | −0.31938E−01 | −31.311 |
| 3 | 6 | 7 | 0.15081E−01 | 66.310 |
| 4 | 9 | 10 | 0.31046E−01 | 32.210 |
| 5 | 10 | 11 | −0.59646E−01 | −16.766 |
| 6 | 12 | 13 | 0.27584E−01 | 36.253 |
| 7 | 14 | 15 | −0.29162E−01 | −34.292 |
| 8 | 15 | 16 | 0.31911E−01 | 31.337 |
| 9 | 17 | 18 | 0.22351E−01 | 44.741 |

First-Order Properties of Doublets

| Element Number | | Surface Numbers | | Power | f |
|---|---|---|---|---|---|
| 4 | 5 | 9 | 11 | −0.27494E−01 | −36.371 |
| 7 | 8 | 14 | 16 | 0.35356E−02 | 282.83 |

First Order Properties of the Lens

| Power | f |
|---|---|
| 0.14984 | 6.6737 |

TABLE 6B

| Surf. No. | Type | Radius | Thickness | Glass | Clear Aperture Diameter |
|---|---|---|---|---|---|
| 1 | ac | 64.9391 | 5.00000 | ACRYLIC | 68.08 |
| 2 | ac | 22.8728 | 26.17379 | | 51.42 |
| 3 | | 30382.7400 | 2.50000 | S-LAH60 | 30.15 |
| 4 | | 16.7146 | 29.75796 | | 23.63 |
| 5 | | ∞ | 25.00000 | | 20.76 |
| 6 | | 40.4350 | 3.50000 | S-TIH53 | 20.89 |

TABLE 6B-continued

| | | | | |
|---|---|---|---|---|
| 7 | −2552.3240 | 1.00000 | | 20.56 |
| 8 | ∞ | 1.86601 | | 20.26 |
| 9 | Aperture stop | 11.86539 | | 20.14 |
| 10 | ∞ | 5.20000 | | 19.40 |
| 11 | 263.2549 | 5.00000 | S-FSL5 | 19.06 |
| 12 | −18.7263 | 1.20000 | S-LAH60 | 18.91 |
| 13 | 42.7349 | 0.70000 | | 19.95 |
| 14 | 28.5760 | 6.50000 | S-FPL51 | 21.41 |
| 15 | −36.7839 | 0.20000 | | 22.18 |
| 16 | 55.3202 | 1.20000 | S-LAH60 | 22.90 |
| 17 | 16.7641 | 8.90000 | S-FPL51 | 22.59 |
| 18 | −81.5454 | 0.20000 | | 23.91 |
| 19 | 24.7515 | 7.00000 | S-FPL51 | 25.76 |
| 20 | −106.6722 | 6.00000 | | 25.35 |
| 21 | ∞ | 23.00000 | BK7 | 22.88 |
| 22 | ∞ | 5.50000 | | 17.40 |
| 23 | ∞ | 3.00000 | COR-7056 | 15.39 |
| 24 | ∞ | 0.48246 | | 14.66 |

Symbol Description
a—Polynomial asphere
c—Conic section
Focal Shift −0.01500

Conics

| Surface Number | Constant |
|---|---|
| 1 | −1.0000E+00 |
| 2 | −1.0000E+00 |

Even Polynomial Aspheres

| Surf. No. | D | E | F | G | H | I |
|---|---|---|---|---|---|---|
| 1 | 1.473936E−06 | 1.384807E−09 | 7.998037E−13 | −2.162996E−16 | −2.297162E−19 | 4.067107E−22 |
| 2 | 1.577617E−06 | 2.081115E−09 | 1.792320E−13 | 1.283889E−14 | 1.843717E−17 | −4.317552E−20 |

First Order Data

| | | | |
|---|---|---|---|
| f/number | 2.40 | Overall Length | 779.647 |
| Magnification | −0.0107 | Forward Vertex Distance | 180.746 |
| Object Height | −675.51 | Barrel Length | 180.263 |
| Object Distance | −598.901 | Entrance Pupil Distance | 31.6494 |
| Effective Focal Length | 6.76732 | Exit Pupil Distance | −1288.46 |
| Image Distance | 0.482463 | Stop Diameter | 16.116 |
| Stop Surface Number | 9 | Distance to Stop | 0.00 |

First Order Properties of Elements

| Element Number | Surface Numbers | | Power | f |
|---|---|---|---|---|
| 1 | 1 | 2 | −0.13435E−01 | −74.434 |
| 2 | 3 | 4 | −0.50185E−01 | −19.926 |
| 3 | 6 | 7 | 0.21468E−01 | 46.582 |
| 4 | 11 | 12 | 0.27816E−01 | 35.951 |
| 5 | 12 | 13 | −0.65035E−01 | −15.376 |
| 6 | 14 | 15 | 0.29969E−01 | 33.368 |
| 7 | 16 | 17 | −0.34399E−01 | −29.071 |
| 8 | 17 | 18 | 0.34767E−01 | 28.763 |
| 9 | 19 | 20 | 0.24371E−01 | 41.032 |

First-Order Properties of Doublets

| Element Number | | Surface Numbers | | Power | f |
|---|---|---|---|---|---|
| 4 | 5 | 11 | 13 | −0.36457E−01 | −27.430 |
| 7 | 8 | 16 | 18 | 0.12723E−02 | 785.96 |

First Order Properties of the Lens

| Power | f |
|---|---|
| 0.14777 | 6.7673 |

TABLE 6C

| Surf. No. | Type | Radius | Thickness | Glass | Clear Aperture Diameter |
|---|---|---|---|---|---|
| 1 | ac | 68.0217 | 6.00000 | ACRYLIC | 67.76 |
| 2 | ac | 19.1531 | 23.16647 | | 46.37 |
| 3 | | −198.7631 | 2.50000 | S-PHM52 | 34.05 |
| 4 | | 18.2449 | 30.50182 | | 26.62 |
| 5 | | ∞ | 25.00000 | | 22.39 |
| 6 | | 34.4684 | 3.00000 | S-TIH6 | 17.92 |
| 7 | | 113.4169 | 1.00000 | | 17.21 |
| 8 | | ∞ | 6.20683 | | 16.95 |
| 9 | | Aperture stop | 10.79594 | | 15.29 |
| 10 | | ∞ | 4.20000 | | 16.84 |
| 11 | | 74.9189 | 5.50000 | S-FPL51 | 17.89 |
| 12 | | −15.9984 | 1.20000 | S-LAH55 | 18.03 |
| 13 | | 59.1066 | 0.70000 | | 19.45 |
| 14 | | 30.6063 | 6.60000 | S-BAL41 | 21.09 |
| 15 | | −30.6063 | 0.20000 | | 21.79 |
| 16 | | 318.8753 | 1.20000 | S-LAH65 | 21.79 |
| 17 | | 16.4514 | 8.40000 | S-FPL51 | 21.64 |
| 18 | | −54.8640 | 0.20000 | | 22.76 |
| 19 | | 24.0116 | 6.00000 | S-FPL51 | 24.52 |
| 20 | | −110.2028 | 6.00000 | | 24.24 |
| 21 | | ∞ | 23.00000 | BK7 | 22.05 |
| 22 | | ∞ | 5.50000 | | 17.11 |
| 23 | | ∞ | 3.00000 | COR-7056 | 15.31 |
| 24 | | ∞ | 0.47998 | | 14.65 |

Symbol Description
a—Polynomial asphere
c—Conic section
Focal Shift −0.05699

Conics

| Surface Number | Constant |
|---|---|
| 1 | −1.0000E+00 |
| 2 | −1.0000E+00 |

Even Polynomial Aspheres

| Surf. No. | D | E | F | G | H | I |
|---|---|---|---|---|---|---|
| 1 | 8.418811E−07 | 8.186240E−10 | 1.108474E−12 | −1.824174E−16 | −3.571742E−19 | 2.720491E−22 |
| 2 | 3.549935E−06 | 8.449522E−10 | −3.380142E−12 | 1.522337E−15 | 1.661974E−16 | −2.390803E−19 |

First Order Data

| | | | |
|---|---|---|---|
| f/number | 2.40 | Overall Length | 779.608 |
| Magnification | −0.0106 | Forward Vertex Distance | 180.351 |
| Object Height | −685.55 | Barrel Length | 179.871 |
| Object Distance | −599.257 | Entrance Pupil Distance | 29.8865 |
| Effective Focal Length | 6.65344 | Exit Pupil Distance | −1225.55 |
| Image Distance | 0.479985 | Stop Diameter | 14.388 |
| Stop Surface Number | 9 | Distance to Stop | 0.00 |

First Order Properties of Elements

| Element Number | Surface Numbers | | Power | f |
|---|---|---|---|---|
| 1 | 1 | 2 | −0.17770E−01 | −56.276 |
| 2 | 3 | 4 | −0.37285E−01 | −26.821 |
| 3 | 6 | 7 | 0.16691E−01 | 59.913 |
| 4 | 11 | 12 | 0.37049E−01 | 26.991 |
| 5 | 12 | 13 | −0.67159E−01 | −14.890 |
| 6 | 14 | 15 | 0.35548E−01 | 28.131 |
| 7 | 16 | 17 | −0.46504E−01 | −21.504 |
| 8 | 17 | 18 | 0.37841E−01 | 26.427 |
| 9 | 19 | 20 | 0.24906E−01 | 40.151 |

First-Order Properties of Doublets

| Element Number | Surface Numbers | | Power | f |
|---|---|---|---|---|

TABLE 6C-continued

| 4 | 5 | 11 | 13 | −0.28127E−01 | −35.553 |
| 7 | 8 | 16 | 18 | −0.63584E−02 | −157.27 |

First Order Properties of the Lens

| Power | f' |
|---|---|
| 0.15030 | 6.6534 |

TABLE 6D

| Surf. No. | Type | Radius | Thickness | Glass | Clear Aperture Diameter |
|---|---|---|---|---|---|
| 1 | ac | 67.7170 | 6.00000 | ACRYLIC | 67.73 |
| 2 | ac | 19.0387 | 22.51327 | | 46.78 |
| 3 | | −121.8806 | 2.50000 | S-PHM52 | 35.00 |
| 4 | | 19.0748 | 31.20149 | | 27.50 |
| 5 | | ∞ | 25.00000 | | 24.62 |
| 6 | | 34.9195 | 3.00000 | S-LAM7 | 21.58 |
| 7 | | −765.9801 | 1.00000 | | 21.17 |
| 8 | | ∞ | 12.03295 | | 20.48 |
| 9 | | Aperture stop | 4.84309 | | 13.83 |
| 10 | | ∞ | 4.20000 | | 14.13 |
| 11 | | −58.0139 | 5.50000 | S-FPL51 | 14.50 |
| 12 | | −12.1448 | 1.20000 | S-LAH55 | 15.13 |
| 13 | | 73.8194 | 0.70000 | | 16.99 |
| 14 | | 28.6152 | 6.60000 | S-BSL7 | 19.09 |
| 15 | | −23.2712 | 0.20000 | | 20.07 |
| 16 | | 1156.7680 | 1.20000 | S-LAH64 | 20.27 |
| 17 | | 15.5959 | 8.40000 | S-FPL51 | 20.62 |
| 18 | | −34.4229 | 0.20000 | | 21.95 |
| 19 | | 23.5315 | 6.00000 | S-FSL5 | 24.36 |
| 20 | | −71.5408 | 6.00000 | | 24.20 |
| 21 | | ∞ | 23.00000 | BK7 | 21.93 |
| 22 | | ∞ | 5.50000 | | 17.08 |
| 23 | | ∞ | 3.00000 | COR-7056 | 15.30 |
| 24 | | ∞ | 0.48285 | | 14.66 |

Symbol Description
a—Polynomial asphere
c—Conic section
Focal Shift −0.07094

Conics

| Surface Number | Constant |
|---|---|
| 1 | −1.0000E+00 |
| 2 | −1.0000E+00 |

Even Polynomial Aspheres

| Surf. No. | D | E | F | G | H | I |
|---|---|---|---|---|---|---|
| 1 | 6.238560E−07 | 3.818280E−10 | 1.184364E−12 | 1.094879E−16 | −4.929732E−19 | 2.753405E−22 |
| 2 | 3.167735E−06 | −2.052266E−09 | −7.718050E−12 | −5.983693E−15 | 1.775379E−16 | −2.343006E−19 |

First Order Data

| | | | |
|---|---|---|---|
| f/number | 2.40 | Overall Length | 779.641 |
| Magnification | −0.0106 | Forward Vertex Distance | 180.274 |
| Object Height | −685.55 | Barrel Length | 179.791 |
| Object Distance | −599.367 | Entrance Pupil Distance | 29.7952 |
| Effective Focal Length | 6.65342 | Exit Pupil Distance | −777.232 |
| Image Distance | 0.482846 | Stop Diameter | 13.031 |
| Stop Surface Number | 9 | Distance to Stop | 0.00 |

First Order Properties of Elements

| Element Number | Surface Numbers | Power | f' |
|---|---|---|---|
| 1 | 1 2 | −0.17884E−01 | −55.916 |
| 2 | 3 4 | −0.37866E−01 | −26.409 |

TABLE 6D-continued

| | | | | |
|---|---|---|---|---|
| 3 | 6 | 7 | 0.22556E−01 | 44.334 |
| 4 | 11 | 12 | 0.33745E−01 | 29.634 |
| 5 | 12 | 13 | −0.81004E−01 | −12.345 |
| 6 | 14 | 15 | 0.38628E−01 | 25.888 |
| 7 | 16 | 17 | −0.50072E−01 | −19.971 |
| 8 | 17 | 18 | 0.43846E−01 | 22.807 |
| 9 | 19 | 20 | 0.27051E−01 | 36.967 |

First-Order Properties of Doublets

| Element Number | | Surface Numbers | | Power | f |
|---|---|---|---|---|---|
| 4 | 5 | 11 | 13 | −0.49564E−01 | −20.176 |
| 7 | 8 | 16 | 18 | −0.21810E−02 | −458.50 |

First Order Properties of the Lens

| Power | f |
|---|---|
| 0.15030 | 6.6534 |

TABLE 7

| Surf. No. | Type | Radius | Thickness | Glass | Clear Aperture Diameter |
|---|---|---|---|---|---|
| 1 | ac | 126.1051 | 6.50000 | ACRYLIC | 87.22 |
| 2 | ac | 22.0758 | 32.80226 | | 57.62 |
| 3 | | −69.5100 | 3.50000 | S-BAL35 | 47.65 |
| 4 | | 33.4890 | 36.78476 | | 41.97 |
| 5 | | 193.0000 | 8.50000 | S-LAH60 | 52.96 |
| 6 | | −87.2380 | 1.00000 | | 53.11 |
| 7 | | ∞ | 84.43506 | | 50.76 |
| 8 | | Aperture stop | 9.43310 | | 13.78 |
| 9 | | 59.6490 | 4.00000 | S-FPL51 | 15.29 |
| 10 | | −22.7860 | 1.20000 | S-LAH60 | 15.48 |
| 11 | | 91.4400 | 1.50000 | | 16.09 |
| 12 | | 1084.6600 | 3.20000 | S-BSM22 | 16.83 |
| 13 | | −38.1500 | 12.33184 | | 17.61 |
| 14 | | 110.0850 | 4.00000 | S-FPL51 | 21.88 |
| 15 | | −39.8750 | 0.20000 | | 22.00 |
| 16 | | 32.3240 | 3.50000 | S-NSL5 | 22.00 |
| 17 | | 156.4800 | 3.20000 | | 22.00 |
| 18 | | ∞ | 3.00000 | S-NSL5 | 21.25 |
| 19 | | ∞ | 2.00000 | | 20.73 |
| 20 | | ∞ | 25.00000 | SK2 | 20.18 |
| 21 | | ∞ | 4.00000 | | 16.01 |
| 22 | | ∞ | 3.00000 | COR-7056 | 14.94 |
| 23 | | ∞ | 0.48071 | | 14.41 |

Symbol Description
a—Polynomial asphere
c—Conic section
Focal Shift −0.01900

Conics

| Surface Number | Constant |
|---|---|
| 1 | −1.0000E+00 |
| 2 | −1.0000E+00 |

Even Polynomial Aspheres

| Surf. No. | D | E | F | G | H | I |
|---|---|---|---|---|---|---|
| 1 | 9.159437E−07 | −9.989874E−12 | −9.009157E−15 | −1.575391E−17 | 8.230552E−21 | 2.327705E−25 |
| 2 | 3.524965E−06 | 9.116012E−10 | 2.791581E−12 | −1.326122E−15 | −1.566026E−18 | −2.746372E−21 |

First Order Data

| | | | |
|---|---|---|---|
| f/number | 2.40 | Overall Length | 966.827 |
| Magnification | −0.0093 | Forward Vertex Distance | 253.568 |
| Object Height | −766.06 | Barrel Length | 253.087 |

TABLE 7-continued

| | | | |
|---|---|---|---|
| Object Distance | −713.260 | Entrance Pupil Distance | 37.2275 |
| Effective Focal Length | 6.99832 | Exit Pupil Distance | −1072.29 |
| Image Distance | 0.480712 | Stop Diameter | 13.033 |
| Stop Surface Number | 8 | Distance to Stop | 0.00 |

First Order Properties of Elements

| Element Number | Surface Numbers | | Power | f |
|---|---|---|---|---|
| 1 | 1 | 2 | −0.18071E−01 | −55.338 |
| 2 | 3 | 4 | −0.26499E−01 | −37.737 |
| 3 | 5 | 6 | 0.13776E−01 | 72.588 |
| 4 | 9 | 10 | 0.29744E−01 | 33.620 |
| 5 | 10 | 11 | −0.46234E−01 | −21.629 |
| 6 | 12 | 13 | 0.16943E−01 | 59.023 |
| 7 | 14 | 15 | 0.16877E−01 | 59.252 |
| 8 | 16 | 17 | 0.13001E−01 | 76.916 |

First-Order Properties of Doublets

| Element Number | | Surface Numbers | | Power | f |
|---|---|---|---|---|---|
| 4 | 5 | 9 | 11 | −0.15281E−01 | −65.441 |

First Order Properties of the Lens

| Power | f |
|---|---|
| 0.14289 | 6.9983 |

TABLE 8

| Surf. No. | Type | Radius | Thickness | Glass | Clear Aperture Diameter |
|---|---|---|---|---|---|
| 1 | ac | 103.1989 | 4.50000 | ACRYLIC | 67.90 |
| 2 | ac | 18.84932 | 23.63000 | | 45.00 |
| 3 | | −60.3680 | 2.20000 | S-LAM2 | 41.00 |
| 4 | | 36.4100 | 14.89000 | | 38.00 |
| 5 | | 118.8020 | 8.41000 | S-LAM7 | 43.50 |
| 6 | | −57.2900 | 20.02000 | | 43.70 |
| 7 | | ∞ | 38.56000 | | 40.00 |
| 8 | | Aperture stop | Space 1 | | 16.20 |
| 9 | | 54.1200 | 6.97000 | S-FPL51 | 18.60 |
| 10 | | −24.8960 | 2.97000 | S-LAH66 | 18.90 |
| 11 | | −47.7700 | 17.99000 | | 19.70 |
| 12 | | 55.9350 | 1.98000 | S-TIH53 | 25.10 |
| 13 | | 28.7080 | 1.87000 | | 24.90 |
| 14 | | 32.3240 | 5.92000 | S-FPL51 | 26.50 |
| 15 | | −93.6720 | 0.94000 | | 27.00 |
| 16 | | 37.0050 | 4.69000 | S-FSL5 | 27.50 |
| 17 | | −599.4720 | Space 2 | | 27.20 |
| 18 | | ∞ | 24.00000 | S-BSL7 | 30.00 |
| 19 | | ∞ | 4.00000 | | 30.00 |
| 20 | | ∞ | 3.00000 | S-FSL5 | 24.00 |
| 21 | | ∞ | Image distance | | 24.00 |

Symbol Description
a—Polynomial asphere
c—Conic section

Conics

| Surface Number | Constant |
|---|---|
| 1 | 4.0240E+00 |
| 2 | −5.3171E−01 |

Even Polynomial Aspheres

| Surf. No. | D | E | F | G | H | I |
|---|---|---|---|---|---|---|

TABLE 8-continued

| 1 | 5.403579E−06 | −7.515931E−09 | 4.387823E−12 | 3.086128E−15 | −4.918884E−18 | 1.752408E−21 |
| 2 | 3.328325E−06 | 1.202511E−08 | −8.461645E−11 | 7.278228E−14 | 2.596786E−16 | −4.230940E−19 |

Variable Spaces

| Focus Pos. | Space 1 T(8) | Space 2 T(17) | Focal Shift | Image Distance |
|---|---|---|---|---|
| 1 | 11.286 | 3.382 | −0.060 | 0.440 |
| 2 | 11.313 | 3.355 | −0.060 | 0.440 |
| 3 | 11.336 | 3.332 | −0.060 | 0.440 |

First Order Data

| | | | |
|---|---|---|---|
| f/number | 2.35 | 2.35 | 2.35 |
| Magnification | −0.0171 | −0.0145 | −0.0121 |
| Object Height | −586.70 | −693.40 | −826.80 |
| Object Distance | −544.12 | −648.34 | −778.71 |
| Effective Focal Length | 9.8215 | 9.8203 | 9.8193 |
| Image Distance | 0.43984 | 0.44021 | 0.44010 |
| Overall Length | 745.77 | 849.99 | 980.36 |
| Forward Vertex Distance | 201.65 | 201.65 | 201.65 |
| Barrel Length | 201.21 | 201.21 | 201.21 |
| Stop Surface Number | 8 | 8 | 8 |
| Distance to Stop | 0.00 | 0.00 | 0.00 |
| Stop Diameter | 16.151 | 16.149 | 16.147 |
| Entrance Pupil Distance | 29.543 | 29.543 | 29.543 |
| Exit Pupil Distance | −7260.43 | −8421.12 | −9749.06 |

First Order Properties of Elements

| Element Number | Surface Numbers | | Power | f |
|---|---|---|---|---|
| 1 | 1 | 2 | −0.21034E−01 | −47.543 |
| 2 | 3 | 4 | −0.33252E−01 | −30.073 |
| 3 | 5 | 6 | 0.19120E−01 | 52.300 |
| 4 | 9 | 10 | 0.28374E−01 | 35.244 |
| 5 | 10 | 11 | −0.14082E−01 | −71.013 |
| 6 | 12 | 13 | −0.14012E−01 | −71.369 |
| 7 | 14 | 15 | 0.20418E−01 | 48.977 |
| 8 | 16 | 17 | 0.14000E−01 | 71.427 |

First-Order Properties of Doublets

| Element Number | | Surface Numbers | | Power | f |
|---|---|---|---|---|---|
| 4 | 5 | 9 | 11 | 0.14124E−01 | 70.800 |
| 6 | 7 | 12 | 15 | 0.69022E−02 | 144.88 |

First Order Properties of the Lens

| Power | f |
|---|---|
| 0.10182 | 9.8215 |

TABLE 9

| Material | Catalog | N | V | Q |
|---|---|---|---|---|
| Acrylic | PLASTICS | 1.491738 | 57.4 | 120.0 |
| S-PHM52 | OHARA | 1.617998 | 63.3 | 45.0 |
| S-LAH60 | OHARA | 1.833995 | 37.1 | −34.0 |
| S-FPL51 | OHARA | 1.496998 | 81.5 | 120.0 |
| S-LAH65 | OHARA | 1.803996 | 46.6 | −40.0 |
| S-BSM28 | OHARA | 1.617719 | 49.8 | 6.3 |
| S-NSL3 | OHARA | 1.518227 | 58.9 | 11.0 |
| S-BAH27 | OHARA | 1.701533 | 41.2 | 0.5 |
| S-TIH1 | OHARA | 1.717357 | 29.5 | 31 |
| S-BSL7 | OHARA | 1.516328 | 64.1 | −6.8 |
| S-FPL52 | OHARA | 1.455998 | 90.3 | 140 |
| S-PHM53 | OHARA | 1.602999 | 65.4 | 38.0 |
| S-LAH51 | OHARA | 1.785892 | 44.2 | −33 |
| S-LAM55 | OHARA | 1.761997 | 40.1 | −4.9 |
| S-TIH13 | OHARA | 1.740764 | 27.8 | 44 |
| S-LAH64 | OHARA | 1.78798 | 47.3 | −40 |
| S-LAH52 | OHARA | 1.799512 | 42.2 | −31 |
| S-BAH28 | OHARA | 1.723416 | 37.9 | 6.7 |
| S-LAH55 | OHARA | 1.834803 | 42.7 | −42 |
| S-BSM16 | OHARA | 1.620409 | 60.3 | 7.2 |
| S-TIH10 | OHARA | 1.728245 | 28.4 | 37.0 |
| S-LAM54 | OHARA | 1.756995 | 47.8 | −39.0 |
| S-TIH6 | OHARA | 1.805181 | 25.4 | 64 |
| S-LAH66 | OHARA | 1.7725 | 49.6 | −38 |
| S-FSL5 | OHARA | 1.48749 | 70.2 | 11 |
| S-TIH53 | OHARA | 1.84666 | 23.8 | 73 |
| S-NBH8 | OHARA | 1.72047 | 34.7 | −36 |
| S-BAL41 | OHARA | 1.56384 | 60.7 | −1.4 |

TABLE 9-continued

| Material | Catalog | N | V | Q |
|---|---|---|---|---|
| S-BAL35 | OHARA | 1.58913 | 61.2 | 3.1 |
| S-BSM22 | OHARA | 1.62229 | 53.1 | 7.3 |
| S-LAM7 | OHARA | 1.74949 | 35.3 | 1.6 |
| S-LAM2 | OHARA | 1.744 | 44.8 | −6.7 |
| S-NSL36 | OHARA | 1.51742 | 52.4 | 1.9 |

TABLE 10

| Ex. No. | f0 | f1 | f2 | fSU2/CC1 | fSU2/P | fSU2/CC2 | fSU2/P' |
|---|---|---|---|---|---|---|---|
| 1 | 10.08 | 566.05 | 38.31 | 2517.9 | 50.60 | 151.17 | — |
| 2 | 10.24 | 123.83 | 38.57 | −29574.00 | 43.46 | 266.48 | — |
| 3a | 9.93 | 161.01 | 39.23 | −331.78 | 43.89 | 189.55 | 350.61 |
| 3b | 10.44 | 207.44 | 40.29 | −264.06 | 49.82 | 179.05 | 220.98 |
| 4 | 6.74 | −59.95 | 29.16 | −44.04 | 29.12 | −250.31 | 42.06 |
| 5a | 11.40 | 1756.66 | 38.80 | −172.38 | 74.47 | 359.52 | 76.27 |
| 5b | 6.78 | −179.48 | 29.06 | −67.55 | 34.23 | −735.76 | 47.44 |
| 5c | 7.03 | −188.61 | 30.67 | −56.32 | 45.47 | 103.68 | 56.61 |
| 5d | 6.82 | 602.91 | 27.74 | −55.17 | 40.41 | 87.77 | 69.20 |
| 5e | 7.04 | −223.74 | 30.33 | −68.75 | 66.29 | 77.23 | 57.68 |
| 6a | 6.67 | 55.81 | 34.12 | −36.37 | 36.25 | 282.83 | 44.74 |
| 6b | 6.77 | 23.20 | 38.04 | −27.43 | 33.37 | 785.96 | 41.03 |
| 6c | 6.65 | 56.69 | 34.02 | −35.55 | 28.13 | −157.27 | 40.15 |
| 6d | 6.65 | 19.64 | 31.35 | −20.18 | 25.89 | −458.50 | 36.97 |
| 7 | 7.00 | −222.13 | 31.17 | −65.44 | 59.02 | 59.25 | 76.92 |
| 8 | 9.82 | −59.07 | 37.68 | 70.80 | — | 144.88 | 71.43 |

TABLE 11

| Ex. No. | Vp/CC1 | Vn/CC1 | Qp/CC1 | Qn/CC1 | Ve/CC1 | Vn/CC2 | Vp/CC2 | Qn/CC2 | Qp/CC2 | Ve/CC2 | \|RI1/Δv\| | \|RI2/Δv\| |
|---|---|---|---|---|---|---|---|---|---|---|---|---|
| 1 | 81.5 | 47.3 | 120 | −40 | 2390.26 | 47.3 | 81.5 | −40 | 120 | 201.71 | 0.52 | 0.56 |
| 2 | 81.5 | 47.3 | 120 | −40 | −27628.66 | 42.2 | 81.5 | −31 | 120 | 375.56 | 0.50 | 0.46 |
| 3a | 90.3 | 46.6 | 140 | −40 | −309.38 | 44.2 | 81.5 | −33 | 120 | 265.89 | 0.41 | 0.50 |
| 3b | 81.5 | 42.7 | 120 | −42 | −173.83 | 42.7 | 81.5 | −42 | 120 | 242.44 | 0.56 | 0.52 |
| 4 | 81.5 | 46.6 | 120 | −40 | −6.87 | 46.6 | 81.5 | −40 | 120 | −223.56 | 0.41 | 0.56 |
| 5a | 81.5 | 42.7 | 120 | −42 | −108.70 | 49.6 | 81.5 | −38 | 120 | 266.22 | 0.50 | 1.14 |
| 5b | 81.5 | 42.7 | 120 | −42 | −46.14 | 49.6 | 81.5 | −38 | 120 | −609.24 | 0.40 | 0.66 |
| 5c | 70.2 | 37.1 | 11 | −34 | −8.77 | 49.6 | 70.2 | −38 | 11 | 100.75 | 0.54 | 1.30 |
| 5d | 81.5 | 37.1 | 120 | −34 | −34.04 | 49.6 | 81.5 | −38 | 120 | 127.43 | 0.34 | 0.73 |
| 5e | 70.2 | 37.1 | 11 | −34 | −13.96 | 37.1 | 70.2 | −34 | 11 | 97.64 | 0.59 | 0.89 |
| 6a | 81.5 | 42.7 | 120 | −42 | 0.60 | 42.2 | 81.5 | −31 | 120 | 387.52 | 0.49 | 0.50 |
| 6b | 70.2 | 37.1 | 11 | −34 | 12.62 | 37.1 | 81.5 | −34 | 120 | 1223.99 | 0.57 | 0.38 |
| 6c | 81.5 | 42.7 | 120 | −42 | −5.40 | 46.6 | 81.5 | −40 | 120 | −144.21 | 0.41 | 0.47 |
| 6d | 81.5 | 42.7 | 120 | −42 | 14.30 | 47.3 | 81.5 | −40 | 120 | −552.51 | 0.31 | 0.46 |
| 7 | 81.5 | 37.1 | 120 | −34 | −46.39 | — | 81.5 | — | 120 | 81.50 | 0.51 | — |
| 8 | 81.5 | 49.6 | 120 | −38 | 114.27 | 23.8 | 81.5 | 73 | 120 | 192.77 | 0.78 | 0.53 |

What is claimed is:

1. A projection lens for forming an enlarged image of a pixelized panel on a screen, said projection lens having an optical axis, a long conjugate side, a short conjugate side, and an effective focal length $f_0$, said lens, in order from the long conjugate side to the short conjugate side, comprising:
   (I) a first lens unit which, in order from the long conjugate side to the short conjugate side, comprises:
      (A) a lens element $L_{U1/N1}$ which:
         (i) has a short conjugate surface which is concave towards the short conjugate side,
         (ii) comprises at least one aspheric surface, and
         (iii) has a negative optical power; and
      (B) at least one other lens element; and
   (II) a second lens unit having a positive power, said lens unit, in order from the long conjugate side to the short conjugate side, comprising:
      (A) a first color-correcting doublet which, from the long conjugate side to the short conjugate side, has a positive-followed-by-negative form;
      (B) a first positive lens element; and
      (C) a second color-correcting doublet which, from the long conjugate side to the short conjugate side, has a negative-followed-by-positive form;
   wherein:
      (a) the first and second lens units are the only lens units of the projection lens;
      (b) the projection lens has an aperture stop that is located between the first and second lens units;
      (c) the projection lens has a field of view in the direction of the long conjugate which is greater than or equal to 75 degrees;
      (d) the projection lens is telecentric on the short conjugate side;
      (e) the projection lens has an effective back focal length BFL which satisfies the relationship:

$$BFL/f_0 \geq 2.0;\ \text{and}$$

(f) the projection lens has a mechanical spacing S between two of its lens elements which satisfies the relationship:

$$S/f_0 \geq 3.5,$$

where the mechanical spacing is the smaller of the center-to-center distance and the edge-to-edge distance between the elements for an unfolded optical axis.

2. The projection lens of claim 1 wherein all of the optical surfaces of the second lens unit which have optical power are spherical surfaces.

3. The projection lens of claim 1 wherein all of the lens elements of the second lens unit are composed of glass.

4. The projection lens of claim 1 wherein the first color-correcting doublet is a cemented doublet.

5. The projection lens of claim 4 wherein the second color-correcting doublet is a cemented doublet.

6. The projection lens of claim 1 wherein the second color-correcting doublet is a cemented doublet.

7. The projection lens of claim 1 wherein the second lens unit comprises a second positive lens element which is either on the long conjugate side of the first color-correcting doublet or on the short conjugate side of the second color-correcting doublet.

8. The projection lens of claim 7 wherein all of the optical surfaces of the second lens unit which have optical power are optical surfaces of the first color-correcting doublet, the second color-correcting doublet, the first positive lens element, and the second positive lens element.

9. The projection lens of claim 1 further comprising a reflective surface for folding the projection lens' optical axis, said reflective surface being located in said mechanical spacing S.

10. The projection lens of claim 1 wherein an axial marginal ray traced through the projection lens from the projection lens' short conjugate focal plane intersects each lens surface of the second lens unit at an angle of incidence that is greater than or equal to 1.5 degrees.

11. A projection lens system comprising:
(a) a pixelized panel; and
(b) the projection lens of claim 1.

12. The projection lens system of claim 11 further comprising an illumination system which comprises a light source and illumination optics which forms an image of the light source.

13. A projection lens for forming an enlarged image of a pixelized panel on a screen, said projection lens having an optical axis, a long conjugate side, a short conjugate side, and an effective focal length $f_0$, said lens, in order from the long conjugate side to the short conjugate side, comprising:
(I) a first lens unit which, in order from the long conjugate side to the short conjugate side, comprises:
(A) a first lens subunit which comprises a lens element $L_{U1/N1}$ which:
  (i) has a short conjugate surface which is concave towards the short conjugate side,
  (ii) comprises at least one aspheric surface, and
  (iii) has a negative optical power; and
(B) a second lens subunit which comprises at least one lens element; and
(II) a second lens unit having a positive power, said lens unit, in order from the long conjugate side to the short conjugate side, comprising:
(A) a first color-correcting subunit, said subunit having an effective V-value Ve/CC1 and comprising a color-correcting doublet which, in order from the long conjugate side to the short conjugate side, comprises:
  (i) a positive lens element having a V-value Vp/CC1, a Q-value Qp/CC1, and a short conjugate radius RI1; and
  (ii) a negative lens element having a V-value Vn/CC1 and a Q-value Qn/CC1; and
(B) a second color-correcting subunit, said subunit having an effective V-value Ve/CC2 and comprising a color-correcting doublet which, in order from the long conjugate side to the short conjugate side, comprises:
  (i) a negative lens element having a V-value Vn/CC2 and a Q-value Qn/CC2; and
  (ii) a positive lens element having a V-value Vp/CC2, a Q-value Qp/CC2, and a long conjugate radius RI2;
wherein:
(a) the first and second lens units are the only lens units of the projection lens;
(b) the projection lens has an aperture stop that is located between the first and second lens units;
(c) the projection lens has a field of view in the direction of the long conjugate which is greater than or equal to 75 degrees;
(d) the projection lens is telecentric on the short conjugate side;
(e) the projection lens has an effective back focal length BFL which satisfies the relationship:

$$BFL/f_0 \geq 2.0;$$

(f) the projection lens has a mechanical spacing S between two of its lens elements which satisfies the relationship:

$$S/f_0 \geq 3.5,$$

where the mechanical spacing is the smaller of the center-to-center distance and the edge-to-edge distance between the elements for an unfolded optical axis; and
(g) Ve/CC1, Vp/CC1, Qp/CC1, RI1, Vn/CC1, Qn/CC1, Ve/CC2, Vn/CC2, Qn/CC2, Vp/CC2, Qp/CC2, and RI2 satisfy the relationships:

$$|Ve/CC1| < |Ve/CC2|,$$

$$0.25 \leq |RI1|/(Vp/CC1 - Vn/CC1)| \leq 0.60,$$

$$Qp/CC1 > 0,$$

$$0.35 \leq |RI2|/(Vp/CC2 - Vn/CC2)| \leq 1.4,$$

$$Qp/CC2 > 0, \text{ and}$$

$$Qn/CC1 < 0 \text{ and/or } Qn/CC2 < 0.$$

14. The projection lens of claim 13 wherein Qn/CC1<0 and Qn/CC2<0.

15. The projection lens of claim 13 wherein all of the optical surfaces of the second lens unit which have optical power are spherical surfaces.

16. The projection lens of claim 13 wherein all of the lens elements of the second lens unit are composed of glass.

17. The projection lens of claim 13 wherein the color-correcting doublet of the first color-correcting subunit unit is a cemented doublet.

18. The projection lens of claim 17 wherein the color-correcting doublet of the second color-correcting subunit is a cemented doublet.

19. The projection lens of claim 13 wherein the color-correcting doublet of the second color-correcting subunit is a cemented doublet.

20. The projection lens of claim 13 wherein the second lens unit further comprises a subunit SU2/P comprising at least one lens element and having a focal length fSU2/P and/or a subunit SU2/P' comprising at least one lens element and having a focal length fSU2/P', wherein:
(i) said subunit SU2/P is between the first color-correcting subunit and the second color-correcting subunit;
(ii) said subunit SU2/P' is either on the long conjugate side of the first color-correcting subunit or on the short conjugate side of the second color-correcting subunit;
(iii) fSU2/P>0; and
(iv) fSU2/P'>0.

21. The projection lens of claim 20 wherein all of the optical surfaces of the second lens unit which have optical power are optical surfaces of:
(i) the first color-correcting subunit,
(ii) the second color-correcting subunit, and
(iii) the SU2/P subunit and/or the SU2/P' subunit.

22. The projection lens of claim 13 wherein the first lens subunit of the first lens unit further comprises a biconcave lens element $L_{U1/N2}$ which:
(i) is on the short conjugate side of the lens element $L_{U1/N1}$, and
(ii) comprises at least one aspheric surface.

23. The projection lens of claim 13 wherein the second lens subunit of the first lens unit is a single positive lens element.

24. The projection lens of claim 13 further comprising a reflective surface for folding the projection lens' optical axis, said reflective surface being located in said mechanical spacing S.

25. The projection lens of claim 13 wherein an axial marginal ray traced through the projection lens from the projection lens' short conjugate focal plane intersects each lens surface of the second lens unit at an angle of incidence that is greater than or equal to 1.5.

26. A projection lens system comprising:
(a) a pixelized panel; and
(b) the projection lens of claim 13.

27. The projection lens system of claim 26 further comprising an illumination system which comprises a light source and illumination optics which forms an image of the light source.

* * * * *

UNITED STATES PATENT AND TRADEMARK OFFICE
CERTIFICATE OF CORRECTION

| | | |
|---|---|---|
| PATENT NO. | : 7,230,770 B2 | Page 1 of 1 |
| APPLICATION NO. | : 11/194324 | |
| DATED | : June 12, 2007 | |
| INVENTOR(S) | : Melvyn H. Kreitzer | |

It is certified that error appears in the above-identified patent and that said Letters Patent is hereby corrected as shown below:

Column 8,
Line 5, delete "64°)." and insert -- 64°. --, therefor.

Column 13,
Line 66, delete "Oi," and insert -- 0i, --, therefor.

Column 58,
Line 34, after "subunit" delete "unit".

Signed and Sealed this

Thirtieth Day of October, 2007

JON W. DUDAS
*Director of the United States Patent and Trademark Office*